(12) United States Patent
Tsukishiro

(10) Patent No.: US 8,661,198 B2
(45) Date of Patent: Feb. 25, 2014

(54) CACHE DEVICE

(75) Inventor: Gen Tsukishiro, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 13/620,521

(22) Filed: Sep. 14, 2012

(65) Prior Publication Data

US 2013/0019066 A1    Jan. 17, 2013

Related U.S. Application Data

(62) Division of application No. 12/706,362, filed on Feb. 16, 2010, now Pat. No. 8,380,934.

(30) Foreign Application Priority Data

Feb. 17, 2009    (JP) .................................. 2009-034588

(51) Int. Cl.
*G06F 12/08*      (2006.01)
(52) U.S. Cl.
USPC ...................... 711/118; 711/143; 711/E12.04
(58) Field of Classification Search
USPC ..................................... 711/118, 143, E12.04
See application file for complete search history.

(56) References Cited

U.S. PATENT DOCUMENTS

| | | |
|---|---|---|
| 4,995,041 A | 2/1991 | Hetherington et al. |
| 6,636,945 B2 * | 10/2003 | Nakamura .................... 711/137 |
| 8,103,832 B2 * | 1/2012 | Gara et al. .................... 711/137 |
| 2009/0300291 A1 | 12/2009 | Moyer et al. |
| 2009/0300294 A1 * | 12/2009 | Moyer et al. .................. 711/144 |

FOREIGN PATENT DOCUMENTS

| | | |
|---|---|---|
| EP | 0 651 331 A1 | 5/1995 |
| JP | 53-148343 | 12/1978 |
| JP | 01-314354 A | 12/1989 |
| JP | 2-208763 A | 8/1990 |
| JP | 05-250258 | 9/1993 |
| JP | 2006-244460 A | 9/2006 |

OTHER PUBLICATIONS

Japanese Office Action, Notification of Reasons for Refusal, dated Apr. 9, 2013, 9 pages.
Japanese Office Action dated Jul. 2, 2013, 6 pages.

* cited by examiner

*Primary Examiner* — Yong Choe
(74) *Attorney, Agent, or Firm* — Arent Fox LLP

(57) ABSTRACT

A cache device interposed between a processor and a memory device, including: a cache memory storing data from the memory device; a buffer holding output data output from the processor; a control circuit determining, on the basis of a request to access the memory device, whether a cache hit has occurred or not and, if a cache miss has occurred, storing the output data in the buffer in response to the access request, outputting a read request for reading the data in a line containing data requested by the access request from the memory device, storing data output from the line of the memory device into the cache memory, and storing the output data from the buffer into the cache memory.

13 Claims, 19 Drawing Sheets

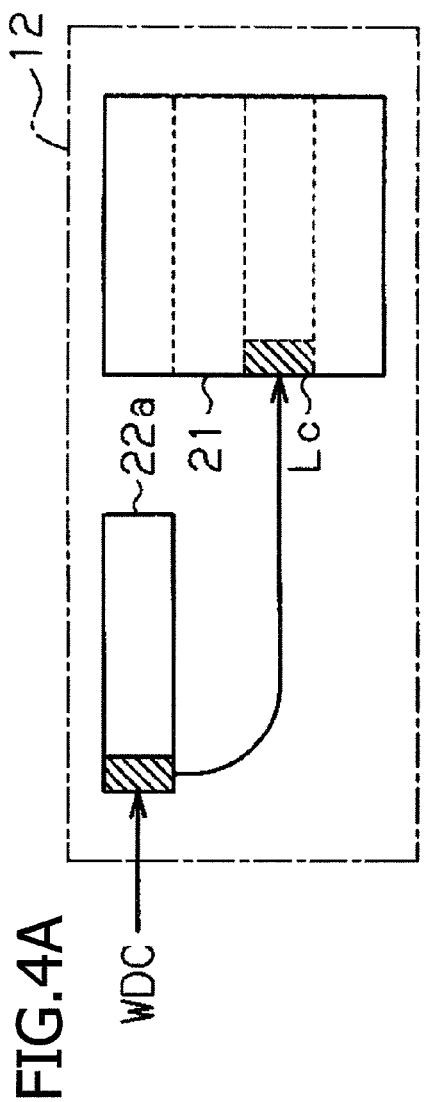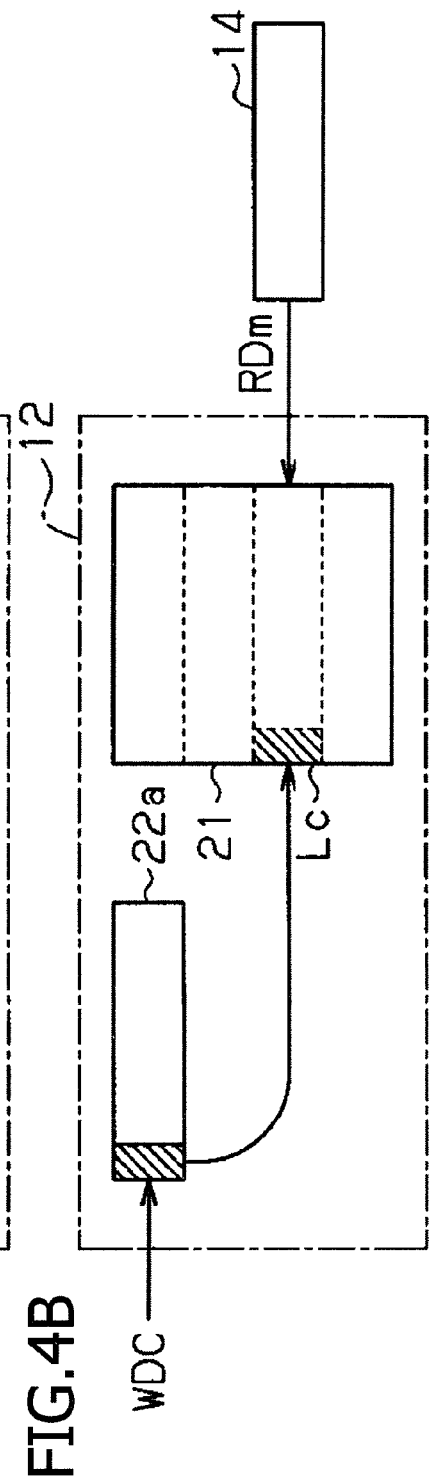

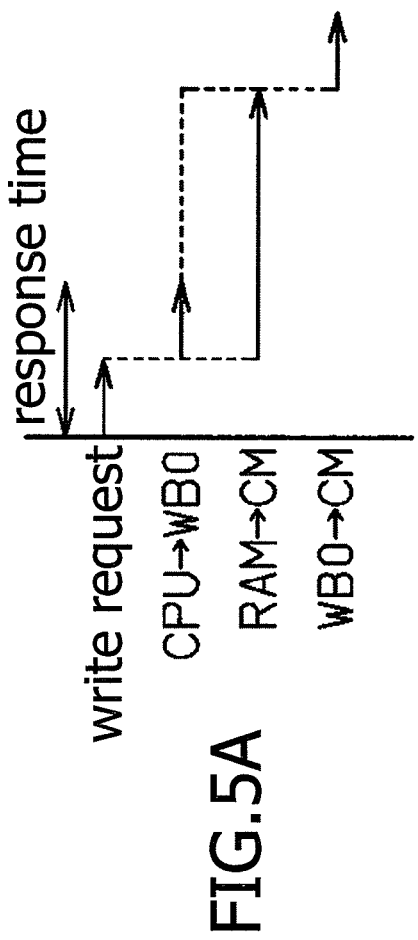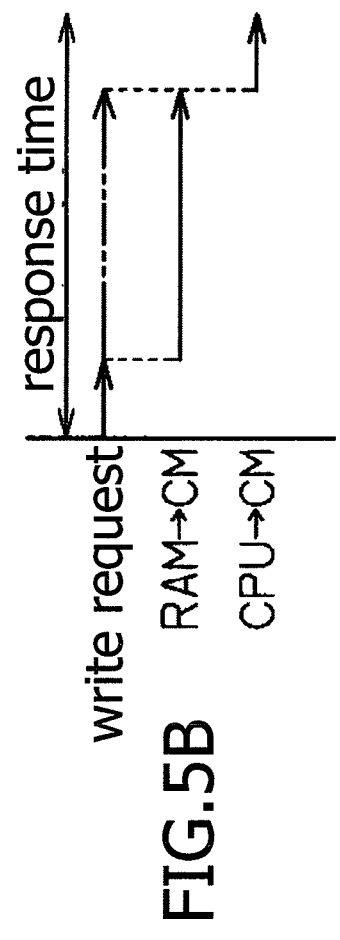
FIG.5A
FIG.5B

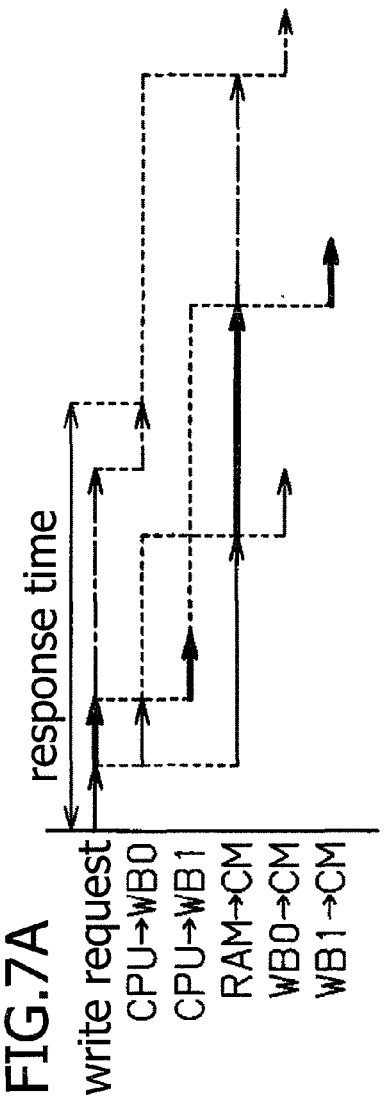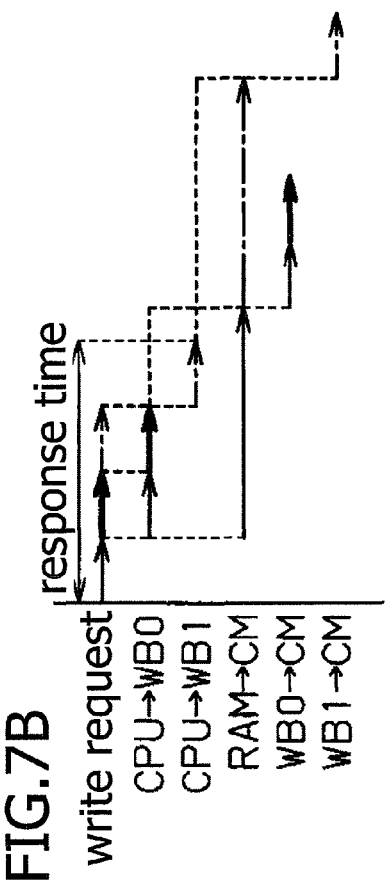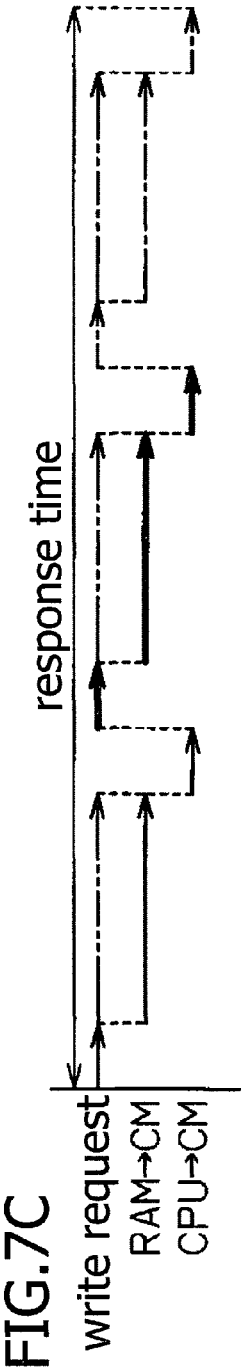

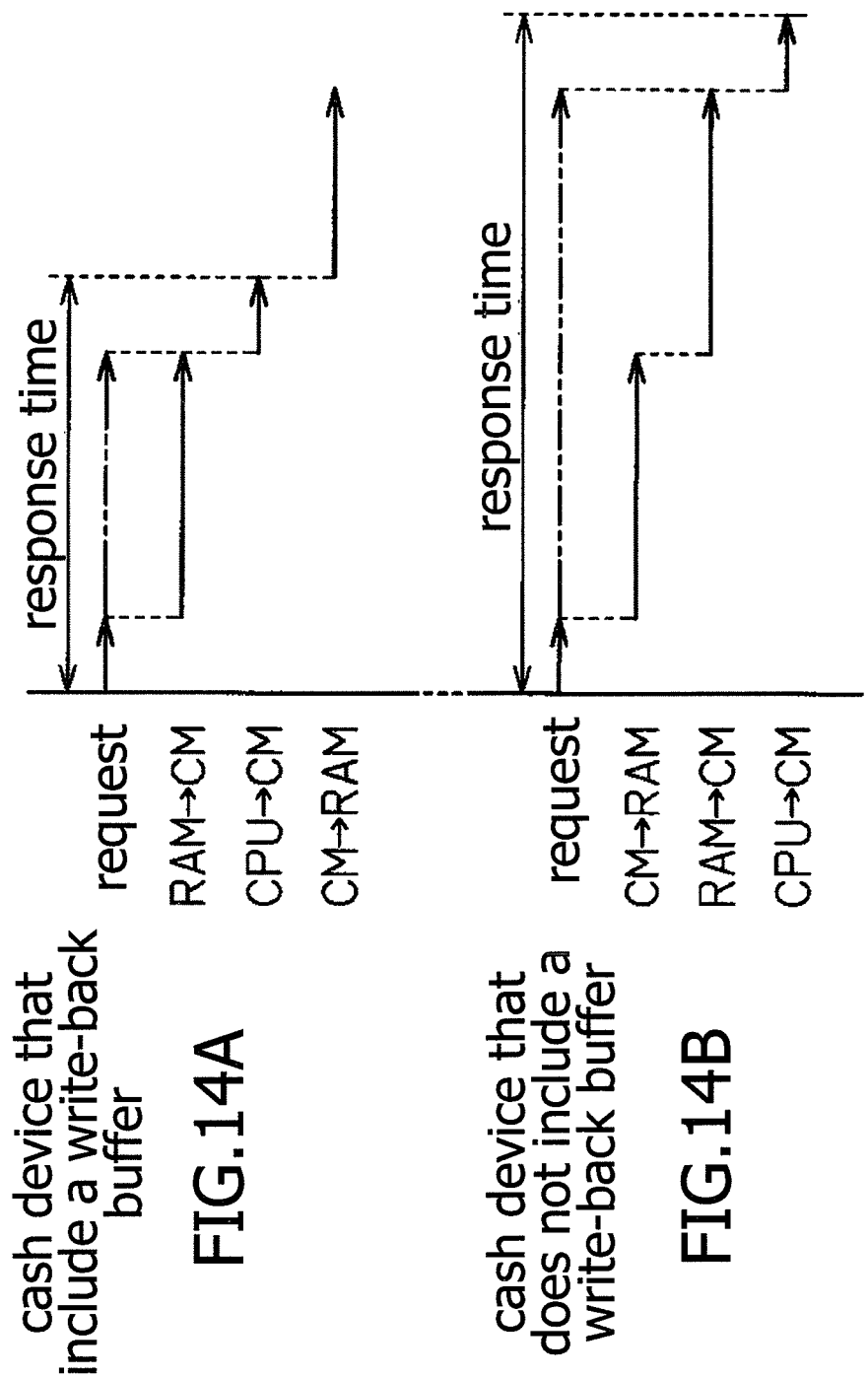

FIG.19C
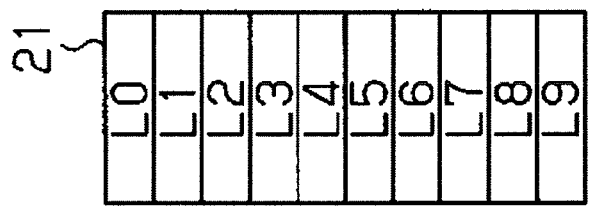
FIG.19B
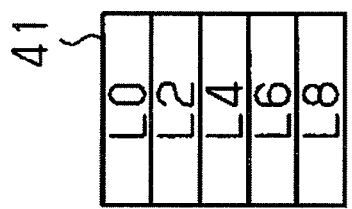 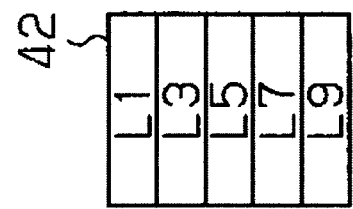
FIG.19A
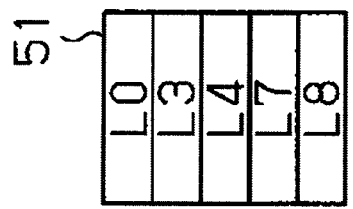 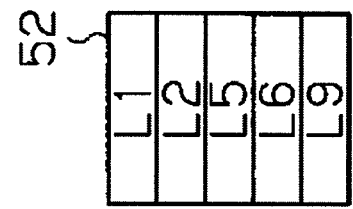

CACHE DEVICE

CROSS REFERENCE TO RELATED APPLICATION

This is a Divisional Application, which claims the benefit of U.S. patent application Ser. No. 12/706,362 filed Feb. 16, 2010 now U.S. Pat. No. 8,380,934, which claims the benefit of Japanese Patent Application No. 2009-034588 filed Feb. 17, 2009. The entire contents of each of the preceding applications are incorporated herein by reference.

FIELD

The embodiment discussed herein are relates to a cache device.

BACKGROUND

In general computer systems, a cache device is interposed between a main memory and a processor which reads information (data) from the main memory in order to reduce time to access the main memory.
[Patent Document 1]
Japanese Laid-open Patent Publication No. 7-152566

The cache device has a memory area (cache memory) where data can be written and read quicker, that is, access speed is faster than the main memory. The cache device stores contents (data) read from and written into locations in the main memory that have been accessed by the processor into the cache memory. When later on the processor accesses the similar data, the cache device retrieves the data from the cache memory, thereby apparently increasing the speed of access to the main memory.

Since data stored at multiple consecutive addresses are likely to be consecutively accessed, the cache device stores multiple blocks, each consisting of a predetermined amount (for example 32 bytes) of data in the cache memory. The cache device includes a management area where the storage locations (line numbers) of the blocks associated with addresses in the main memory are stored.

When requested data is found in the cache memory, it is called a cache hit; when requested data is not found in the cache memory, it is called a cache miss. When the processor requests access to data stored in the main memory, the conventional cache device compares the address of the data with the addresses stored in the management area to determine whether there is a cache hit or not. In the case of a cache hit, the cache device refers to the management area to find the line number of the block that contains the data and performs an operation responding to the access request on the block having the line number. For example, if the access request is a write request, the cache device stores the data output from the processor into the block; if the access request is a read request, the cache device outputs the data from the block to the processor. In the case of a cache miss, the cache device reads one block of data in the memory area that contains the requested data from the main memory, stores the block of data in the cache memory, and performs an operation for the access on the stored block of data.

Typical schemes for mapping a block in the main memory device to a block in the cache memory include set-associative, fully-associative, and sector mapping. Fully-associative mapping is better suited for random access compared with other mapping schemes and provides a higher cache hit ratio.

However, the cache device has latency, the time requested from access to be completed when a cache hit has occurred. Therefore, there is need for reducing time requested from access to be completed, that is, faster access speed.

SUMMARY

According to an aspect of the embodiments, a cache device disclosed herein is interposed between a processor and a main memory and includes: a cache memory storing data from the memory device; a buffer holding output data output from the processor; a control circuit determining, on the basis of a request to access the memory device, whether a cache hit has occurred or not and, if a cache miss has occurred, storing the output data in the buffer in response to the access request, outputting a read request for reading the data in a line containing data requested by the access request from the memory device, storing data output from the line of the memory device into the cache memory, and storing the output data from the buffer into the cache memory.

The object and advantages of the embodiments will be realized and attained by means of the elements and combinations particularly pointed out in the claims.

It is to be understood that both the foregoing general description and the following detailed description and are exemplary and explanatory and are not restrictive of the embodiments, as claimed.

BRIEF DESCRIPTION OF DRAWINGS

FIGS. 4A and 4B are diagrams illustrating data write operations;
FIGS. 5A and 5B are timing diagrams illustrating data write timings;
FIGS. 7A to 7C are timing diagrams illustrating data write timings;
FIGS. 14A and 14B are timing diagrams illustrating write-back timings;
FIGS. 19A to 19C are diagrams illustrating line settings in cache memory.

DESCRIPTION OF EMBODIMENTS

An embodiment will be described below with respect to FIGS. 1 to 12.

Figure 1:
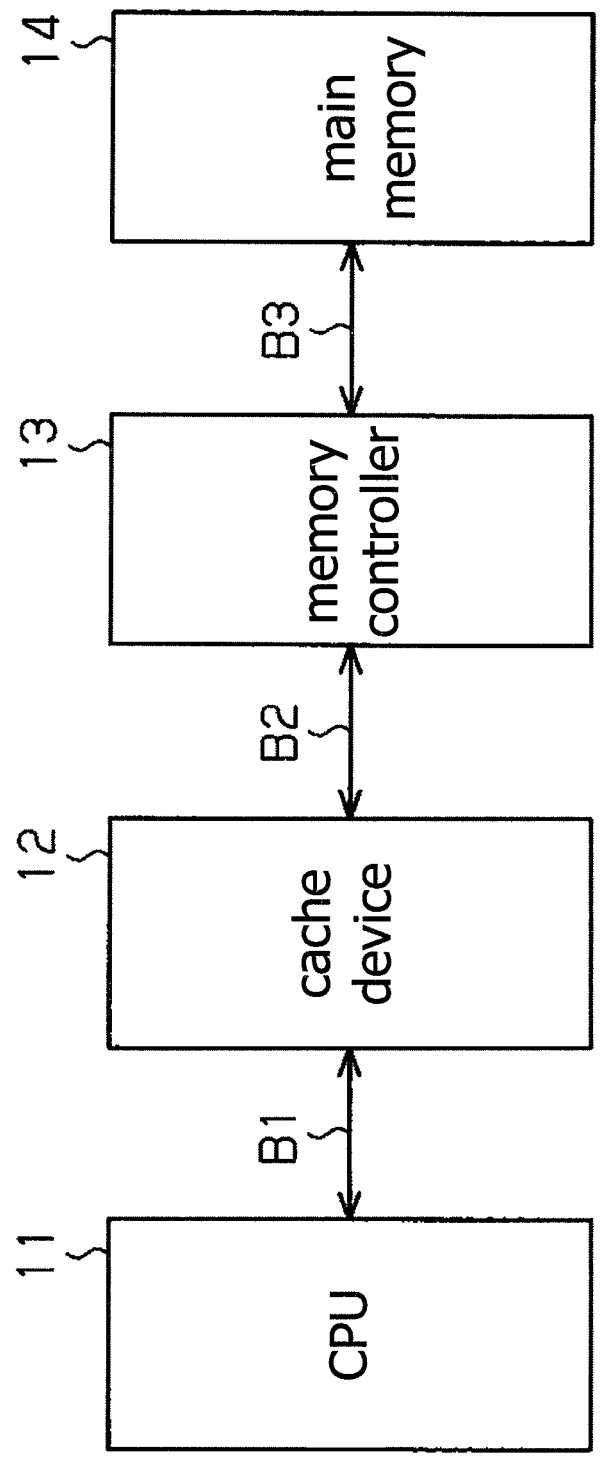
FIG. 1 is a schematic block diagram of a computer system.

As illustrated in FIG. 1, a computer system includes a CPU 11, which is a processor, a cache device 12, a memory controller 13, and a main memory 14, which is a main storage unit. The CPU 11 and the cache device 12 are interconnected through a bus B1, the cache device 12 and the memory controller 13 are interconnected through a bus B2, and the memory controller 13 and the main memory 14 are interconnected through a bus B3. The bus B1 includes a control bus including one or more lines carrying control signals requested from sending and receiving data between the CPU 11 and the cache device 12, an address bus including lines carrying multi-bit address signals, and a data bus including lines carrying multi-bit data. Similarly, each of the buses B2 and B3 includes a control bus, an address bus, and a data bus. Hereinafter, the bus between the CPU 11 and the cache device 12 is referred to as the CPU bus and the bus between the cache device 12 and the main memory 14 is referred to as the memory bus.

The CPU 11 accesses the main memory 14 through the cache device 12 and the memory controller 13. The main memory 14 may be a Synchronous Dynamic Random Access Memory (SDRAM), for example. The main memory 14 stores control programs executed by the CPU 11, data used for execution of the control programs, and data generated by the CPU 11 executing the control programs. The control programs and data are loaded from an auxiliary storage such as a ROM and a disk device (not shown) into the main memory 14 by a boot program executed by the CPU 11 and other processors.

The CPU 11 outputs an access request from reading a control program or data from the main memory 14 (read request) and an access request from writing altered or generated data into the main memory 14 (write request).

The cache device 12 includes a memory (hereinafter referred to as the cache memory) that is faster and has a smaller capacity than the main memory 14. The cache memory may be a static RAM, for example. The cache device 12 stores in the cache memory data from the main memory 14 that the CPU 11 has accessed in the past. When subsequently data requested in an access request output from the CPU 11 is found in the cache memory, it is called a cache hit; otherwise, it is called a cache miss. In response to an access request from the CPU 11, the cache device 12 outputs data stored in the cache memory to the CPU 11 if the access request is a read access request and a cache hit occurs, or writes data into the cache memory if the access is a write access and a cache hit occurs. That is, in the case of a cache hit, the access requested by the CPU 11 is completed by simply sending or receiving data between the CPU 11 and the cache device 12. Therefore, access for data input and output by the CPU 11 can be speeded up by using the cache device 12.

In the case of a cache miss, the cache device 12 outputs a request to access the main memory 14 to the memory controller 13. The cache device 12 outputs the access request to read from the main memory 14 some number of bytes (for example 32 bytes) of data indicated using consecutive addresses including the address of the requested data. The area storing bytes of data is called line. That is, each line contains a number of bytes of data and the addresses of the data are consecutive. A control program executed by the CPU 11 includes multiple instruction words (operation codes) and data (operands). Instruction words that are sequentially executed and the data requested from execution of the instruction words are often stored in locations indicated by consecutive addresses on the main memory 14. Accordingly, access requests from the CPU 11 tend to concentrate in a limited area in the main memory 14 in a certain period of time around a certain point in time. This phenomenon is called locality of reference. By storing data in the area of main memory 14 in which access requests concentrate into the cache memory of the cache device 12, access speed is improved and the number of accesses to the main memory 14 is reduced.

The memory controller 13 outputs one or more signals for accessing the main memory 14 to the main memory 14 in response to a request from the cache device 12. In response to the signal or signals, the main memory 14 performs a write or read operation to write or read data to or from a memory cell. The memory controller 13 receives data from the main memory 14 and outputs the received data to the cache device 12.

A configuration of the cache device 12 will be described below.

Figure 2:
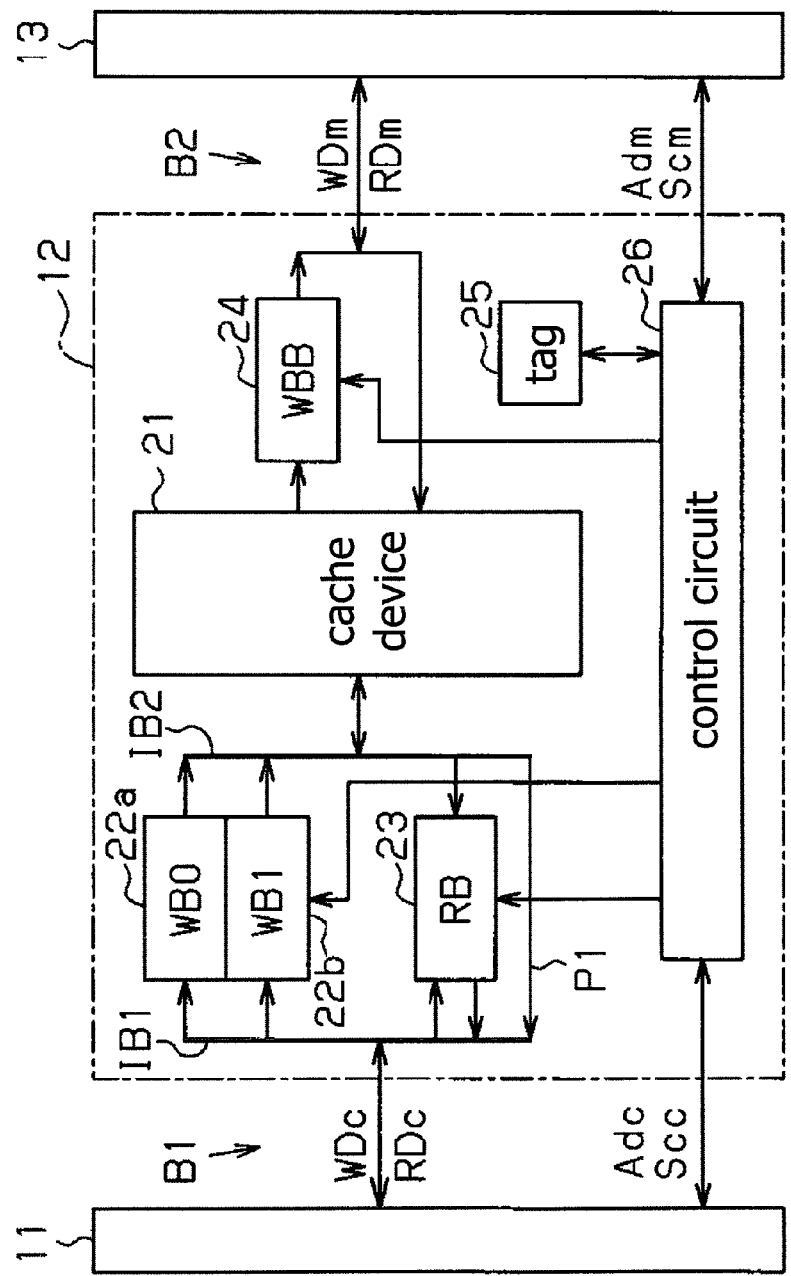
FIG. 2 is a schematic block diagram of a cache device.

As illustrated in FIG. 2, the cache device 12 includes a cache memory 21, multiple (two in the present embodiment) write buffers (WB) 22a and 22b, a read buffer (RB) 23, a write-back buffer (WBB) 24, a tag memory (TAG) 25, and a control circuit 26. The characters in the parentheses are labels in FIG. 2.

The cache memory 21 has memory capacity that can be divided into multiple (for example 128) lines.

The write buffers 22a and 22b and the read buffer 23 are connected between the cache memory 21 and the CPU 11. The write buffers 22a and 22b and the read buffer 23 are buffer memories having a capacity capable of storing one line of data (for example 32 bytes). The write buffers 22a and 22b and the read buffer 23 are connected to the CPU 11 through an internal bus IB1 and a CPU bus B1. The write buffers 22a and 22b and the read buffer 23 are connected to the cache memory 21 through an internal bus IB2.

The internal bus IB1 has the similar bus width as the CPU bus B1. The bus width of the internal bus IB2 can be chosen to a positive integral multiple (1 in the present embodiment) of the bus width of the internal bus IB1, that is, the bus width of the CPU bus B1. The CPU 11 is capable of receiving and outputting multiple bytes (for example 4 bytes) of data at one access request. Accordingly, the CPU bus B1 has a bus width capable of transferring the multiple bytes (4 bytes) of data. The internal buses IB1 and IB2 have the similar bus width (4 bytes) as the CPU bus B1.

While the internal bus between the write buffers 22a, 22b and the CPU 11 and the internal bus between the write buffer 22a, 22b and the cache memory 21 are labeled different reference symbols IB1 and IB2, the internal buses IB1 and IB2 are in fact one electrically connected bus in this embodiment. That is, the cache memory 21 is a single-port static RAM.

Four bytes of write data (output data) WDc output from the CPU 11 is provided to the write buffer 22a or 22b through the CPU bus B1 and the internal bus IB1 and the write buffer 22a or 22b stores the data WDc provided. The data WDc read from the write buffer 22a or 22b is provided to the cache memory 21 through the internal bus IB2, and then the cache memory 21 stores the data WDc provided.

Data read from the cache memory 21 is provided to the read buffer 23 through the internal bus IB2 and the read buffer 23 stores the data. The data read from the read buffer 23 is provided to the CPU 11 through the internal bus IB1 and the CPU bus B1 as read data (input data) RDc.

The read buffer 23 is connected onto the internal bus IB1 so that write data WDc output from the CPU 11 can be stored in the read buffer 23. The cache device 12 according to the present embodiment includes a path (data path) P1 for providing data read from the cache memory 21 directly to the CPU 11. Accordingly, the read buffer is capable of providing data read from the cache memory 21 directly to the CPU 11 as read data RDc.

The write-back buffer 24 is connected between the cache memory 21 and the memory controller 13. The write-back buffer 24 has a capacity of one line (32 bytes) of data. One line of data read from the cache memory 21 is stored in the write-back buffer 24. The data is read from the write-back buffer 24 and provided to the memory controller 13 through the memory bus B2 as write data WDm. On the other hand, read data RDm output from the memory controller 13 onto the memory bus B2 is directly provided to the cache memory 21, where the line of data provided is stored.

The tag memory 25 stores information such as usage of the cache memory 21 and information associating lines stored in the cache memory 21 with lines stored in the main memory 14 (tag information). The control circuit 26 controls write and read to and from the cache memory 21 and the buffers 22a, 22b, 23, and 24 on the basis of the information stored in the tag memory 25. The control circuit 26 is connected to the CPU 11 through the CPU bus B1 and also connected to the memory controller 13 through the memory bus B2. The CPU 11 provides an address signal Adc for an access request to the control circuit 26. A control signal Scc that includes a response signal from the control circuit 26 and a control signals from the CPU 11 is a two-way signal between the CPU 11 and the control circuit 26.

The control circuit 26 determines on the basis of the address signal Adc whether data the CPU 11 is attempting to access is stored in the cache memory 21, that is, whether a cache hit has occurred. As stated above, the tag memory 25 stores tag information associating the lines stored in the cache memory 21 with the lines stored in the main memory 14. The control circuit 26 searches the tag memory 25 for the address indicated in the access request. If the address indicated in the access request is included in the tag information, the control circuit 26 determines that a cache hit has occurred and performs an operation corresponding to the access request according to a cache hit. On the other hand, if the address indicated in the access request is not included in the tag information, the control circuit 26 determines that a cache miss has occurred and performs another operation corresponding to the access request according to a cache miss.

The relationship between the cache memory 21 and the main memory 14 and information stored in the tag memory 25 will be described with reference to FIG. 3.

Figure 3:
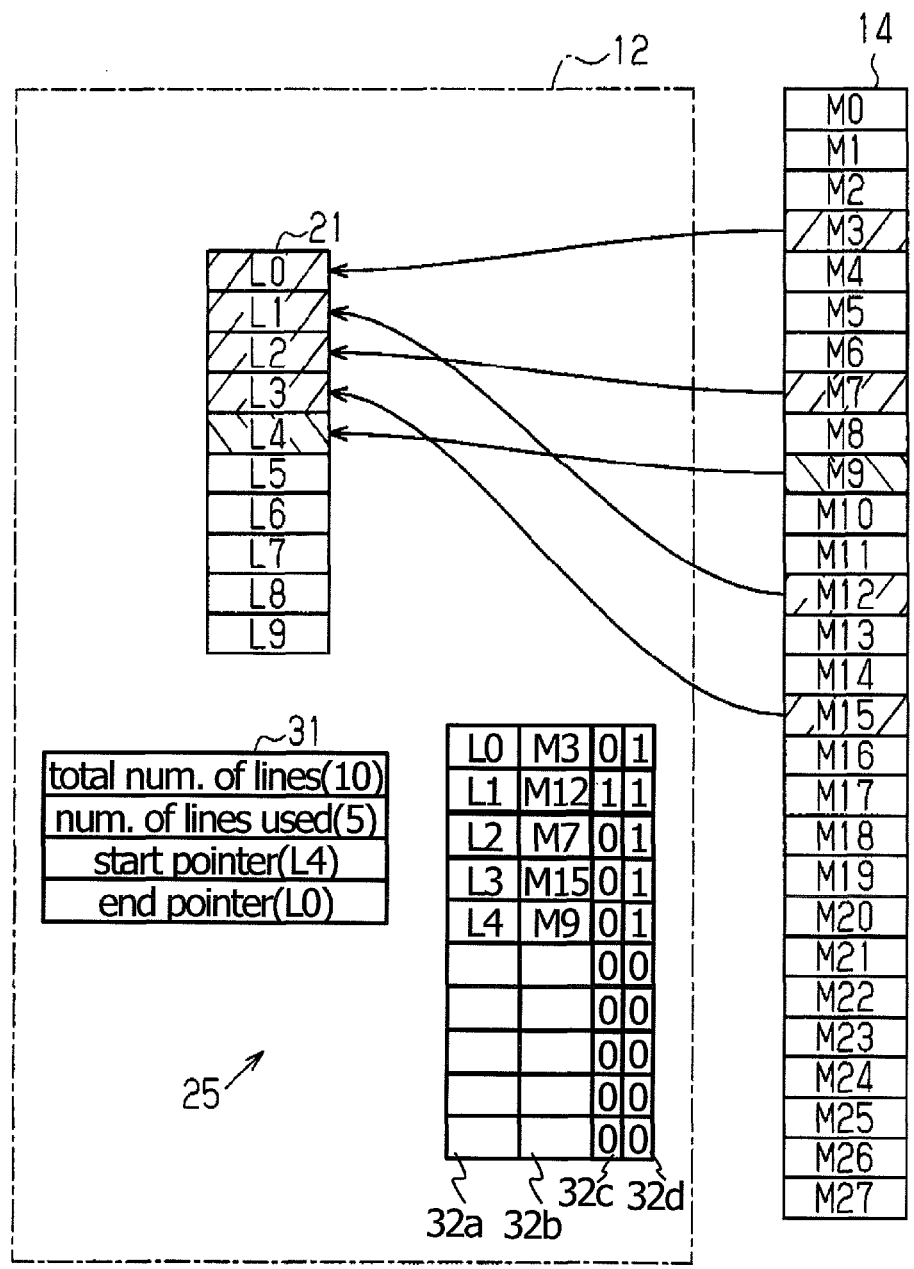
FIG. 3 is a diagram illustrating a cache memory and buffers.

As illustrated in FIG. 3, the tag memory 25 includes a management area 31 and a tag area 32. The management area 31 contains the total number of lines in the cache memory 21, the number of lines used, and start and end pointers. The characters in the parentheses are values indicating the state of the cache memory 21 in FIG. 3. For clarity, the cache memory 21 is illustrated as being capable of storing 10 lines L0 to L9 and the main memory 14 is divided into 28 lines M0 to M27 in FIG. 3. The lines M3, M7, M9, M12, and M15 in the main memory 14 from which data have been read in response to access requests are represented by the hatched boxes. The arrows in FIG. 3 indicate that data in lines M3, M12, M7, M15, and M9 from the main memory 14 are stored in lines L0, L1, L2, L3, and L4 of the cache memory 21.

In the state illustrated in FIG. 3, the total number of lines in the cache memory 21 is "10" and the number of lines used is "5". The start pointer points to the location where the most recent line is written and the end pointer indicates the location where the oldest line is written.

The information stored in the tag area 32 includes line numbers 32a, addresses 32b, a change bit 32c, and a valid bit 32d. The line numbers 32a and addresses 32b indicate locations where data are stored and also indicate correspondence (association) between the lines in the cache memory 21 and the locations in the main memory 14. For example, data in locations indicated by the addresses 32b have been read from the main memory 14 and stored in lines in the cache memory 21 indicated by the line numbers 32a. The data in the lines indicated by the line numbers 32a are written back to the locations in the main memory 14 indicated by the addresses 32b.

The change bit 32c indicates whether data in the line associated with the change bit 32c has been altered by the CPU 11. For example, "1" indicates that the data has been altered whereas "0" indicates that the data has not been altered. The valid bit 32d indicates whether the line in the cache memory 21 is available or not, that is, whether data can be written in the line. For example, "1" indicates that the line is unavailable and "0" indicates the line is available.

When a read access has resulted in a cache miss in the cache device 12 in the state illustrated in FIG. 3, the control circuit 26 reads data at the relevant address from the main memory 14. The control circuit 26 stores the data read from the main memory 14 into line L5 on the basis of the information in the management area 31 and stores information indicating line L5 and the address of the read data into the tag area 32 in association with each other. Since the data has been read and not altered, the control circuit 26 sets the change bit 32c to "0" and the valid bit 32d to "1" to indicate that the data in line L5 is valid.

The control circuit 26 depicted in FIG. 2 manages the cache memory 21 in a round robin fashion. For example, the control circuit 26 stores data read from the main memory 14 in order from lines L0 to L9. After storing data in line L9, the control circuit 26 stores the next data read from the main memory 14 into line L0. That is, the control circuit 26 cyclically uses the lines in the cache memory 21 to store data read from the main memory 14 in the lines.

Operations performed by the control circuit 26 will be described below in conjunction with access requests.

A write access operation performed in response to a write access request will be described first.

When the control circuit 26 determines based on a control signal Scc that the access request from the CPU 11 is a write access, the control circuit 26 selects one of the two write buffers 22a and 22b and permits the CPU 11 to write data into the selected write buffer 22a, 22b. In response to the permission, the CPU 11 outputs data to be written. For example, if the control circuit 26 selects the write buffer 22a, the write buffer 22a stores the write data output from the CPU 11 as illustrated in FIG. 4A. This completes the write request and the write of the write data by the CPU 11. That is, the write access operation for the CPU 11 is completed by writing the write data in the write buffer 22a, 22b. The time that elapses between the output of the write access and the storage of the write data into the write buffer 22a is the response time to the write access from the CPU 11.

The data stored in the write buffer 22a needs to be stored in the cache memory 21. Therefore, when the control circuit 26 determines that an access request from the CPU 11 is a write access, the control circuit 26 determines on the basis of the address signal Adc whether the data that the CPU 11 is attempting to access is stored in the cache memory 21, that is, whether a cache hit has occurred or not. As described above, the tag memory 25 stores tag information associating the lines stored in the cache memory 21 with the lines stored in the main memory 14. The control circuit 26 searches the tag memory 25 for the address indicated in the access request. If the address in the access request is included in the tag information, the control circuit 26 determines that a cache hit has occurred; if the address in the access request is not included in the tag information, the control circuit 26 determines that a cache miss has occurred.

In the case of a cache hit, the control circuit 26 stores data from the write buffer 22a into line Lc in the cache memory 21 as illustrated in FIG. 4A. The control circuit 26 then sets the change bit 32c associated with the line Lc to "1".

On the other hand, in the case of a cache miss, the control circuit 26 outputs an access request for reading the data in the line containing the data indicated by the address to the memory controller 13. The access request contains control signals Scm including a signal indicating a read, and an address signal Adm specifying the address of the line. The line read from the main memory 14 in FIG. 1 according to the access request is provided to the cache device 12 through the memory controller 13 as read data RDm. As illustrated in FIG. 4B, the control circuit 26 stores the read data RDm into line Lc in the cache memory 21 and stores the line number of the line and the address from which the read data RDm has been read into the tag memory 25 in FIG. 3 in association with each other. As in the case of a cache hit, the control circuit 26 stores the data from the write buffer 22a into line Lc in the cache memory 21 and sets the change bit 32c associated with line Lc to "1".

Operations performed when a cache miss has occurred, that is, the operation of writing data into the write buffer 22a (22b) and the operation of reading data from the main memory 14 into the cache memory 21 are performed through different data transfer paths. Therefore the control circuit 26 performs the operation of writing data into the write buffer 22a (22b) and the operation of reading data from the main memory 14 into the cache memory 21 in parallel. This is illustrated in FIG. 5A, in which the main memory 14 is denoted by "RAM", the cache memory 21 is denoted by "CM", and the write buffer 22a is denoted by "WB0". The right-pointing arrow associated with "WRITE REQUEST" in FIG. 5A represents an operation period between the output of a write access from the CPU 11 and the output of data after the access has been permitted. "CPU→WB0" represents an operation period between the output of data from the CPU 11 and the storage of the data into the write buffer 22a. "RAM→CM" represents an operation period between the issuance of a read request by the control circuit 26 to the memory controller 13 and the storage of one line of data read from the main memory 14 into the cache memory 21. "WB0→CM" represents an operation period between the read of data from the write buffer 22a and the storage of the data into the cache memory 21, that is, the operation period during which data is transferred from the write buffer 22a to the cache memory 21. The arrows in FIGS. 5A and 5B and timing diagrams, which will be described below, conceptually represent the order in which the operations are performed and the periods of time requested from the operations and do not necessarily represent actual operation periods.

As illustrated in FIG. 5A, the operation by the CPU 11 to write data into the write buffer 22a (CPU→WB0) is performed in parallel with part of the operation of transferring data from the main memory 14 to the cache memory 21 (RAM→CM). Once the data has been stored in the cache memory 21, the control circuit 26 transfers the data from the write buffer 22a to the cache memory 21 (WB0→CM).

FIG. 5B illustrates a write operation performed in a conventional write-allocate cache device. When a write request has resulted in a cache miss, the cache device transfers data from the main memory to the cache memory (RAM→CM), then permits the CPU to access to write the data in the cache memory (CPU→CM). The solid arrow in FIG. 5B associated with "WRITE REQUEST" represents the period of time until a cache miss occurs and the dashed double-dotted arrow represents the period of time until the access is permitted, that is, the request pending period. Accordingly, the response time to the write access made by the CPU is the time that elapses until the data is written into the cache memory.

The cache device 12 according to the present embodiment performs the operation of reading from the main memory 14 and the operation of writing data from the CPU 11 in parallel in a write allocate operation upon a cache miss. Accordingly, the cache device 12 according to the present embodiment has a fast response time compared with the conventional cache device, that is, the cache device 12 can achieve fast access speed compared with the conventional cache device.

In the conventional cache device that performs the operation illustrated in FIG. 5B, data from the CPU is written into the cache memory after a write request in the case of a cache hit. Accordingly, the response time in the case of a cache miss differs from the response time in the case of a cache hit. In contrast, in the cache device 12 according to the present embodiment, the response time in the case of a cache hit is the similar to the response time in the case of a cache miss because write data is written from the CPU 11 into the write buffer 22a (22b). That is, a write access request can be serviced with the similar response speed.

While the operation in FIG. 5A has been described with respect to a situation where the write buffer 22a can accept data, the write buffer 22a may hold data that has not been written into the cache memory 21. Such a situation can occur when first and second data having addresses not within the address range of one line are written in the similar write buffer. In such cases, when the control circuit 26 determines that a request to access the second data has resulted in a cache miss, the control circuit 26 starts an operation of writing the first data into the cache memory 21 after a request to read the second data is issued to the main memory 14. Upon completion of the write of the first data into the cache memory 21, the control circuit 26 stores the second data into the write buffer 22a. Accordingly, the response time to the write access from the CPU 11 is the time that elapses between the output of the request to access the second data from the CPU 11 and the storage of the second data into the write buffer 22a.

The sum of the time requested from writing the first data into the cache memory 21 and the time requested from storing the second data into the write buffer 22a is significantly shorter than the response time illustrated in FIG. 5B. Thus, the cache device 12 according to the present embodiment has short response time, that is, is capable of achieving fast access, compared with conventional cache devices.

Furthermore, the cache device 12 according to the present embodiment has two write buffers 22a and 22b. The control circuit 26 alternately uses the write buffers 22a and 22b according to the address of data that the CPU 11 is attempting to write, thereby the response time to consecutive write accesses can be reduced.

Figure 6:
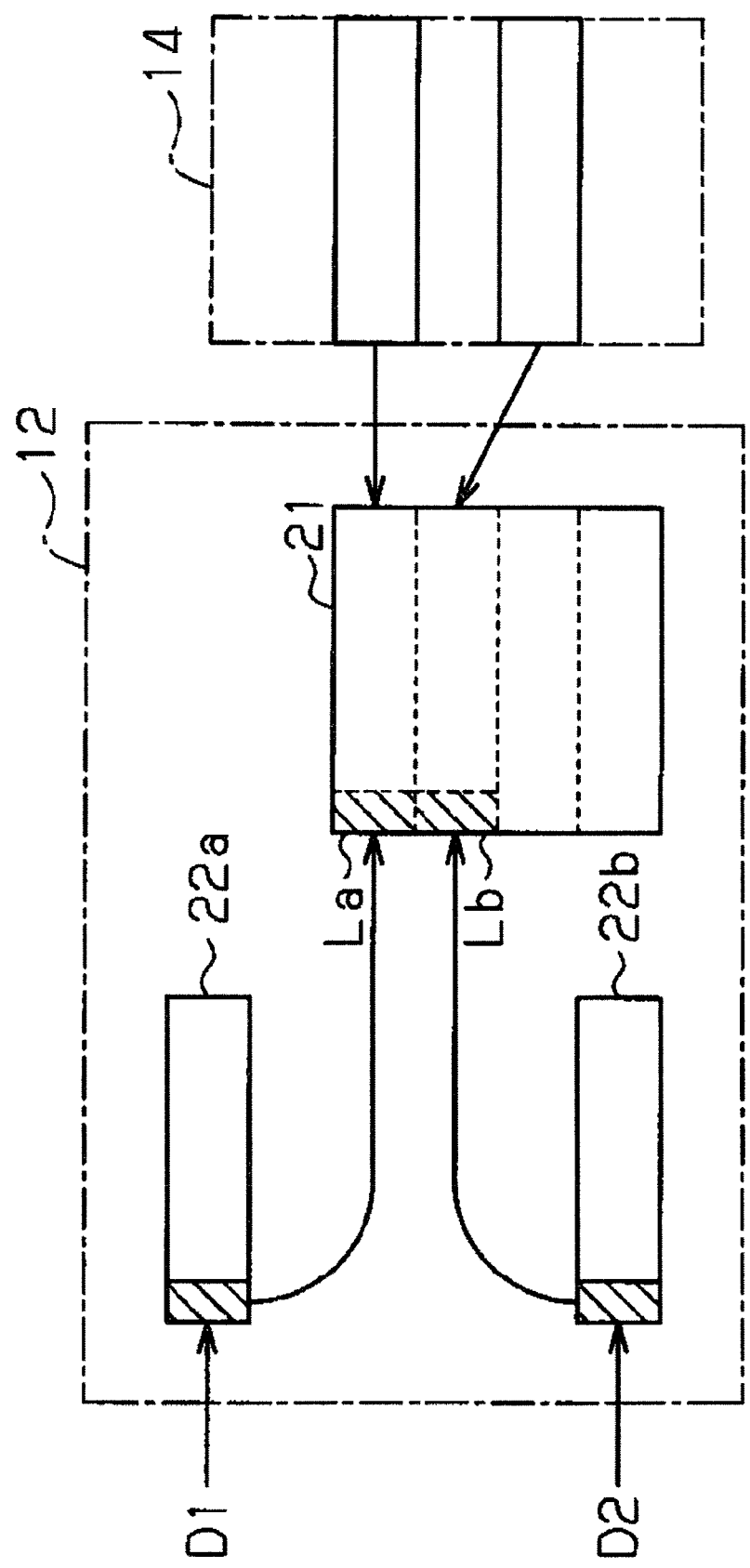
FIG. 6 is a diagram illustrating a data write operation.

The CPU 11 depicted in FIG. 1 consecutively makes write access to Data D1 and D2 with the addresses that are not within the address range of data stored in one line, as illustrated in FIG. 6. The control circuit 26 depicted in FIG. 2 first selects the first write buffer 22a and stores Data D1 into the write buffer 22a. The control circuit 26 then selects the second write buffer 22b and stores Data D2 into the write buffer 22b. Since the operation for the write accesses output from the CPU 11 apparently ends upon completion of the writes of Data D1 and D2, the CPU 11 can start executing other process.

When the control circuit 26 determines that accesses to write Data D1 and D2 have resulted in cache misses, the control circuit 26 sequentially reads data in lines La and Lb in the cache memory 21 associated with the addresses from the main memory 14 and writes the data in lines La and Lb, respectively, in the cache memory 21. The control circuit 26 then writes the data from the write buffers 22a and 22b into lines La and Lb, respectively, in the cache memory 21. With this, the operation of storing Data D1 and D2 in the cache memory 21 will end.

An operation performed when three consecutive write accesses have resulted in cache misses will be described with reference to FIG. 7.

FIGS. 7A to 7C illustrate operations of making write access to three pieces of Data D1, D2, and D3 at addresses that are not within the address range of one line. The Data D1 write operation is represented by thin solid arrows, the Data D2 write operation is represented by thick solid arrows, and Data D3 write operation is represented by dashed-dotted arrows in FIGS. 7A to 7C.

FIG. 7A illustrates an operation waveform when the addresses of Data D1 to D3 are not within the address range of one line.

First, the CPU 11 depicted in FIG. 1 outputs a Data D1 write access request. The control circuit 26 depicted in FIG. 2 selects the first write buffer 22a (WB0), permits the access to Data D1, and outputs a request to access the line corresponding to the address of Data D1 to the memory controller 13. Thus, the operation of writing Data D1 output from the CPU 11 into the write buffer 22a (CPU→WB0) and the operation of accessing the main memory 14 to write the data into the cache memory 21 (RAM→CM) are performed in parallel.

The CPU 11 outputs Data D1 to the first write buffer 22a in response to the access permission and then outputs a Data D2 write access request. The control circuit 26 selects the second write buffer 22b (WB1) and permits the access to Data D2. The CPU 11 outputs Data D2 in response to the access permission and then outputs a Data D3 write access request.

Once the data corresponding to Data D1 has been stored from main memory 14 into the cache memory 21 (RAM→CM), the control circuit 26 outputs a request to access data in the line corresponding to the address of Data D2 to the memory controller 13 and transfers Data D1 stored in the first write buffer 22a to the cache memory 21 (WB0→CM).

Since the first write buffer 22a has become available, the control circuit 26 selects the first write buffer 22a (WB0) and permits access to Data D3. In response to the access permission, the CPU 11 outputs Data D3.

Once the data corresponding to D2 has been stored from the main memory 14 into the cache memory 21 (RAM→CM), the control circuit 26 outputs a request to access the data in the line corresponding to the address of Data D3 to the memory controller 13 and transfers Data D2 from the second write buffer 22b to the cache memory 21 (WB1→CM).

Once the data corresponding to Data D3 has been stored from the main memory 14 into the cache memory 21 (RAM→CM), the control circuit 26 transfers Data D3 from the first write buffer 22a to the cache memory 21 (WB0→CM).

FIG. 7B illustrates an operation waveform when the addresses of Data D1 and D2 are within the address range of one line and the address range of Data D3 is not within the address range of one line of Data D1 and D2.

The CPU 11 depicted in FIG. 1 outputs a Data D1 write access request. The control circuit 26 depicted in FIG. 2 selects the first write buffer 22a (WB0), permits the access to Data D1, and outputs a request to access the data in the line corresponding to the address of Data D1 to the memory controller 13. The control circuit 26 stores addresses corresponding to the output access request, that is, the address values in the address range including the address value of Data D1 and corresponding to the capacity of the line into a register, not shown. Thus, the operation of writing Data D1 into the write buffer 22a (CPU→WB0) and the operation of accessing the main memory 14 to write the data into the cache memory 21 (RAM→CM) are performed in parallel.

The CPU 11 outputs Data D1 in response to the access permission and then outputs a Data D2 write access request. The control circuit 26 compares the address of Data D2 with the values stored in the register to determine whether the address is within the address range described above. Since the address of Data D2 is within the address range of the line that stores Data D1, the control circuit 26 permits the access to Data D2 without changing the selected first write buffer 22a. For example, in response to an access request, the control circuit 26 of the present embodiment compares the address associated with the access request with the addresses stored in the tag area 32 illustrated in FIG. 3 and also with the addresses stored in the register, that is, the address range of data currently being read from the main memory 14. Based on the result of the comparison, the control circuit 26 issues an request to access the main memory 14 or selects one of the write buffers 22a and 22b.

The CPU 11 outputs Data D2 in response to the access permission and then outputs a write access to Data D3. The control circuit 26 selects the second write buffer 22b (WB1) and permits the access to Data D3. In response to the access permission, the CPU 11 outputs Data D3.

Once the data corresponding to Data D1 has been stored from the main memory 14 into the cache memory 21 (RAM→CM), the control circuit 26 transfers Data D1 and D2 stored in the first write buffer 22a to the cache memory 21 (WB0→CM).

Once the data corresponding to Data D3 has been stored from the main memory 14 into the cache memory 21 (RAM→CM), the control circuit 26 transfers Data D3 from the second write buffer 22b to the cache memory 21 (WB1→CM).

FIG. 7C illustrates an operation waveform of a conventional write-allocate cache device.

In response to a write access to Data D1, the cache device transfers data in the line corresponding to the data from the main memory to the cache memory, then permits the CPU to access to write Data D1 into the cache memory. The similar operation is performed for Data D2 and D3.

Operations performed in response to read access requests will be described next.

The read buffer 23 depicted in FIG. 2 improves access speed when the addresses of consecutive read accesses are within the address range of data stored in one line in the cache memory 21.

This will be described in detail below. When the control circuit 26 determines on the basis of a control signal Scc that an access request from the CPU 11 is a read access, the control circuit 26 determines on the basis of an address signal Adc whether data at the address the CPU 11 is attempting to access is stored in the cache memory 21, that is, whether a cache hit has occurred or not.

Figure 8A:
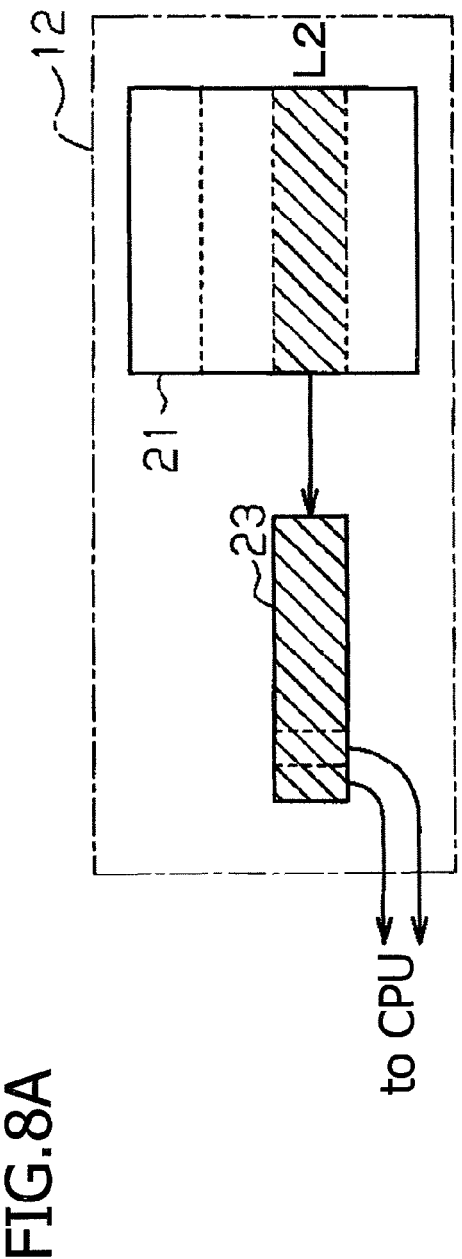
FIGS. 8A and 8B are diagrams illustrating data read operations.

In the case of a cache hit, the control circuit 26 stores the data in the line storing the data at the address indicated in the read access into the read buffer 23. For example, when the data at the address indicated in the read access is stored in line L2 in the cache memory 21 as illustrated in FIG. 8A, the control circuit 26 reads the data in line L2 in the cache memory 21 and stores the data into the read buffer 23, that is, transfers the data from the cache memory 21 to the read buffer 23. The control circuit 26 then reads the data requested by the read access from the read buffer 23 and stores the address of the read data into a register, not shown. Upon reception of the read data by the CPU 11, the operation for the read access will end. The time that elapses between the output of the read access from the CPU 11 and the reception of the data by the CPU 11 is the read access response time.

Then, when the CPU 11 outputs a read access, the control circuit 26 compares the address indicated in the read access with the address stored in the register. If the address just output from the CPU 11 is within the address range of the data that has been stored in the line for the address stored in the register, that is, if the address matches one of the addresses of the multiple pieces of data stored in the read buffer 23, the control circuit 26 outputs the read data corresponding to the address from the read buffer 23.

The capacity of the read buffer 23 is 32 bytes and the size of data (bus width) requested by the CPU 11 at one access is 4 bytes, as given earlier as an example. The register of the control circuit 26 stores the start and end addresses of the multiple pieces of data stored in the read buffer 23. The control circuit 26 compares these two addresses with an address output from the CPU 11 to determine whether the data being requested by the CPU 11 is stored in the read buffer 23. The time requested from the determination is shorter than the time it would take to determine whether requested data is stored in the cache memory 21, that is, whether a cache hit has occurred or not. Accordingly, the control circuit 26 delivers data requested by the CPU 11 fast compared with the case where determination is made as to whether a cache miss has occurred or not. Therefore, the response time to read access from the CPU 11 is reduced. That is, the cache device 12 according to the present embodiment achieves a higher access speed than the conventional cache devices.

Figure 8B:
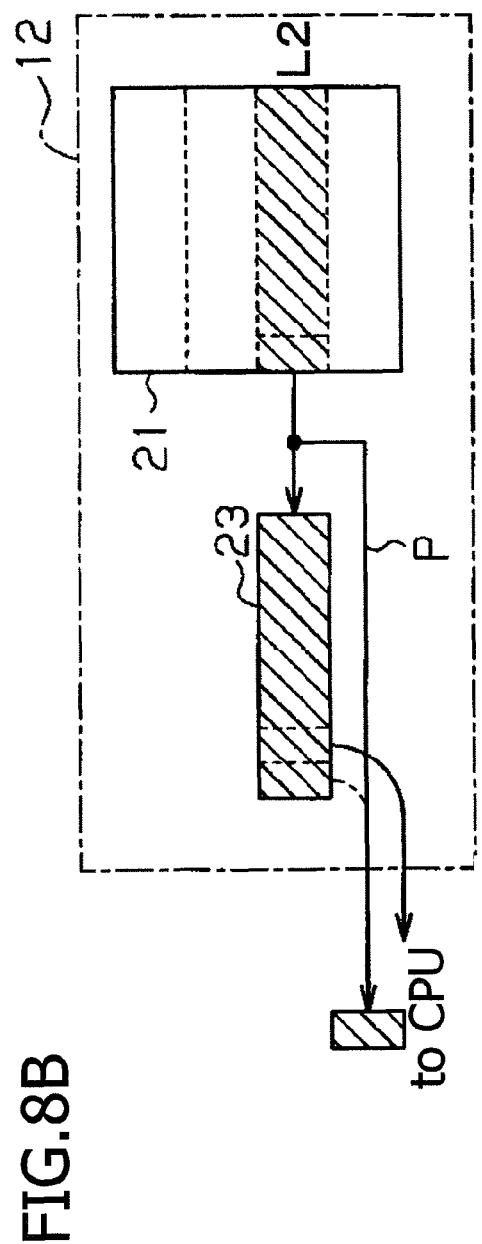

Furthermore, the cache device 12 according to the present embodiment includes a path (data path) P1 for providing data read from the cache memory 21 directly to the CPU 11 as depicted in FIG. 2. If data with the address indicated in read access is stored in line L2 in cache memory 21 as illustrated in FIG. 8B, the control circuit 26 stores the data in line L2 into the read buffer 23 and outputs the data corresponding to the address indicated in the read access through the path P1. In the example illustrated in FIG. 8B, the data at the start address (the leftmost data in line L2) is requested out of multiple pieces of data stored in line L2. The time that expires until the CPU 11 receives the data, that is, the response time is short compared with the time requested from temporarily storing the data in line L2 into the read buffer 23 and then delivering the data to the CPU 11.

Figures 9A, 9B:
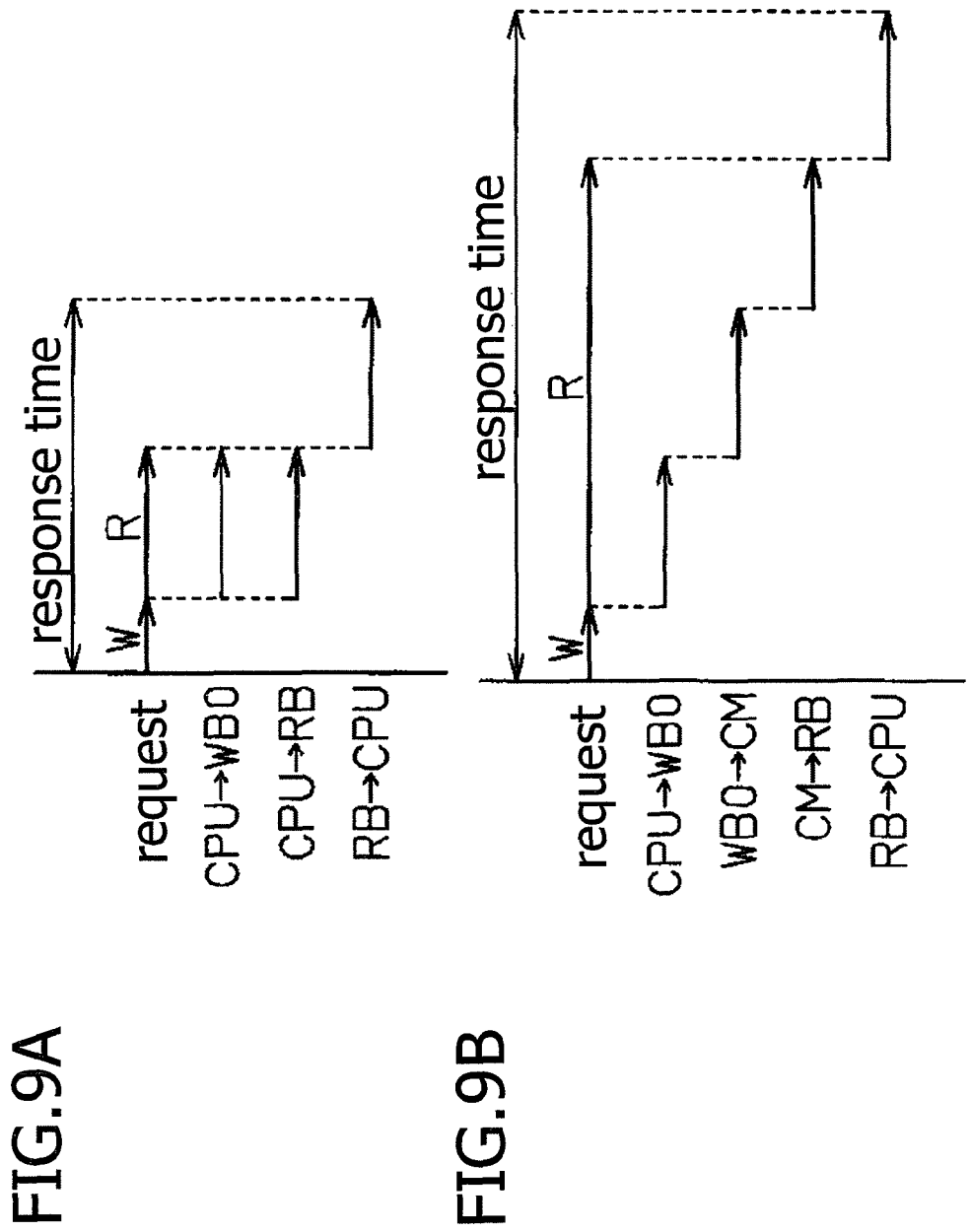
FIGS. 9A and 9B are timing diagrams illustrating data read timings.

The read buffer 23 in the cache device 12 according to the present embodiment is connected onto the internal bus IB1 as depicted in FIG. 2 so that write data WDc output from the CPU 11 can be stored in the read buffer 23. This arrangement improves the access speed when a read access and a write access to the similar address occur successively. After data output from the read buffer 23 is processed by the CPU 11 depicted in FIG. 1, the similar address accessed at the read access is accessed in order to write the processed data. With the write access, the data output from the CPU 11 is written into one of the write buffers 22a and 22b. For example, if the data is written into the write buffer 22a, the data in the write buffer 22a is inconsistent with the data in the read buffer 23, that is, the data coherency may not be ensured. When subsequently a read access to the similar address is made, the data in the write buffer 22a needs to be stored in the cache memory 21 and then be transferred from the cache memory 21 to the read buffer 23 as illustrated in FIG. 9B. On the other hand, the control circuit 26 of the cache device 12 according to the present embodiment stores data output from the CPU 11 in response to a write access (W) into the write buffer 22a (WB0) and at the similar time stores the data into the read buffer 23 (RB) as illustrated in FIG. 9A. By this operation, the coherency between the data in the write buffer 22a and the data in the read buffer 23 can be ensured and therefore the data at the similar address can be output from the read buffer 23 to the CPU 11 at the next read access (R). Accordingly, the response time is reduced and fast access speed can be achieved.

A write-back operation will be described next.

Data stored in the lines of the cache memory 21 are used by the CPU 11 in processing. The data stored in the lines can be altered by the processing executed by the CPU 11. If data in a line has been altered, the data in the line in the cache memory 21 is inconsistent with the data stored in the main memory 14. Such inconsistent data in the line is called dirty data and the line is called dirty line (or dirty entry). In such cases, data needs to be read from the cache memory 21 into the corresponding address in the main memory 14 so that the data in the main memory 14 is consistent with the data in the cache memory 21. This operation of storing data from the cache memory 21 into the main memory 14 is called write-back.

Figure 10:
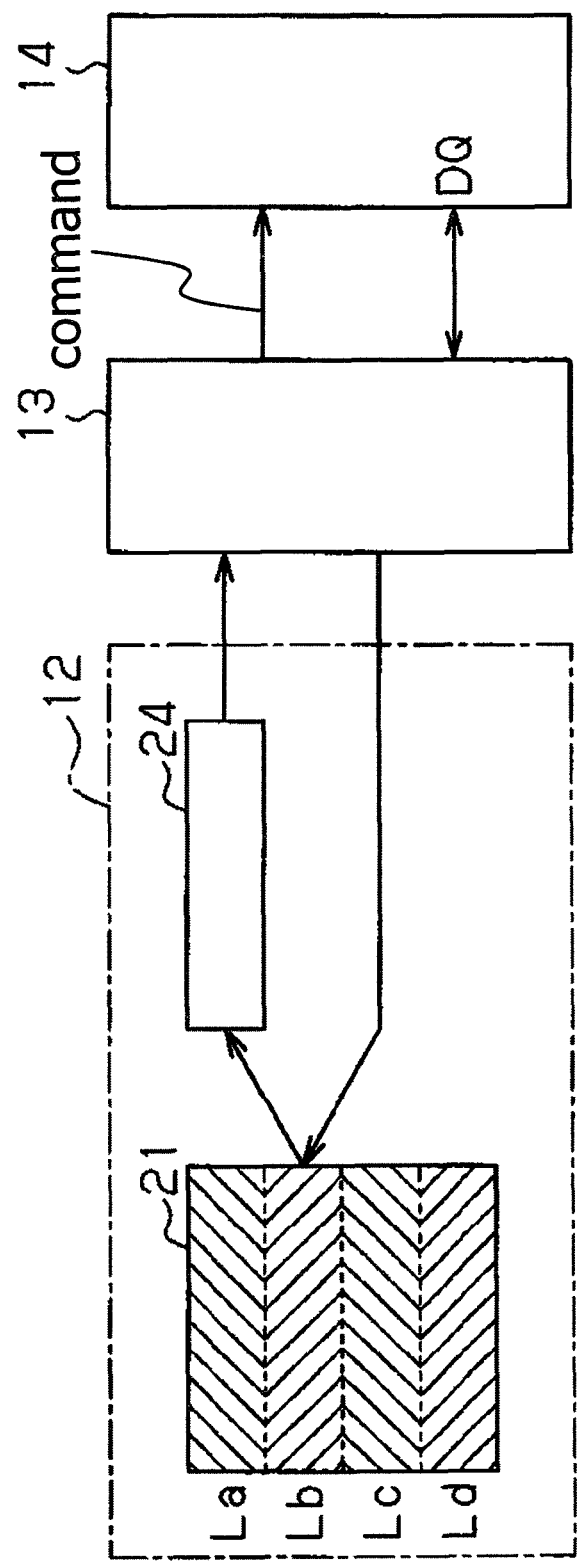
FIG. 10 is a diagram illustrating a write-back operation.

As depicted in FIG. 10, the cache device 12 includes a write-back buffer 24 connected between the cache memory 21 and the memory controller 13. All lines La to Ld of the cache memory 21 contain data. When the control circuit 26 depicted in FIG. 2 determines that an access request has resulted in a cache miss, the control circuit 26 transfers to the write-back buffer 24 the data in line Lb to be written back. The control circuit 26 outputs a write request to the memory controller 13 and then stores the data stored in the write-back buffer 24 into the main memory 14 through the memory controller 13.

The use of the write-back buffer 24 as described above can reduce the response time to the CPU 11.

Figure 11:
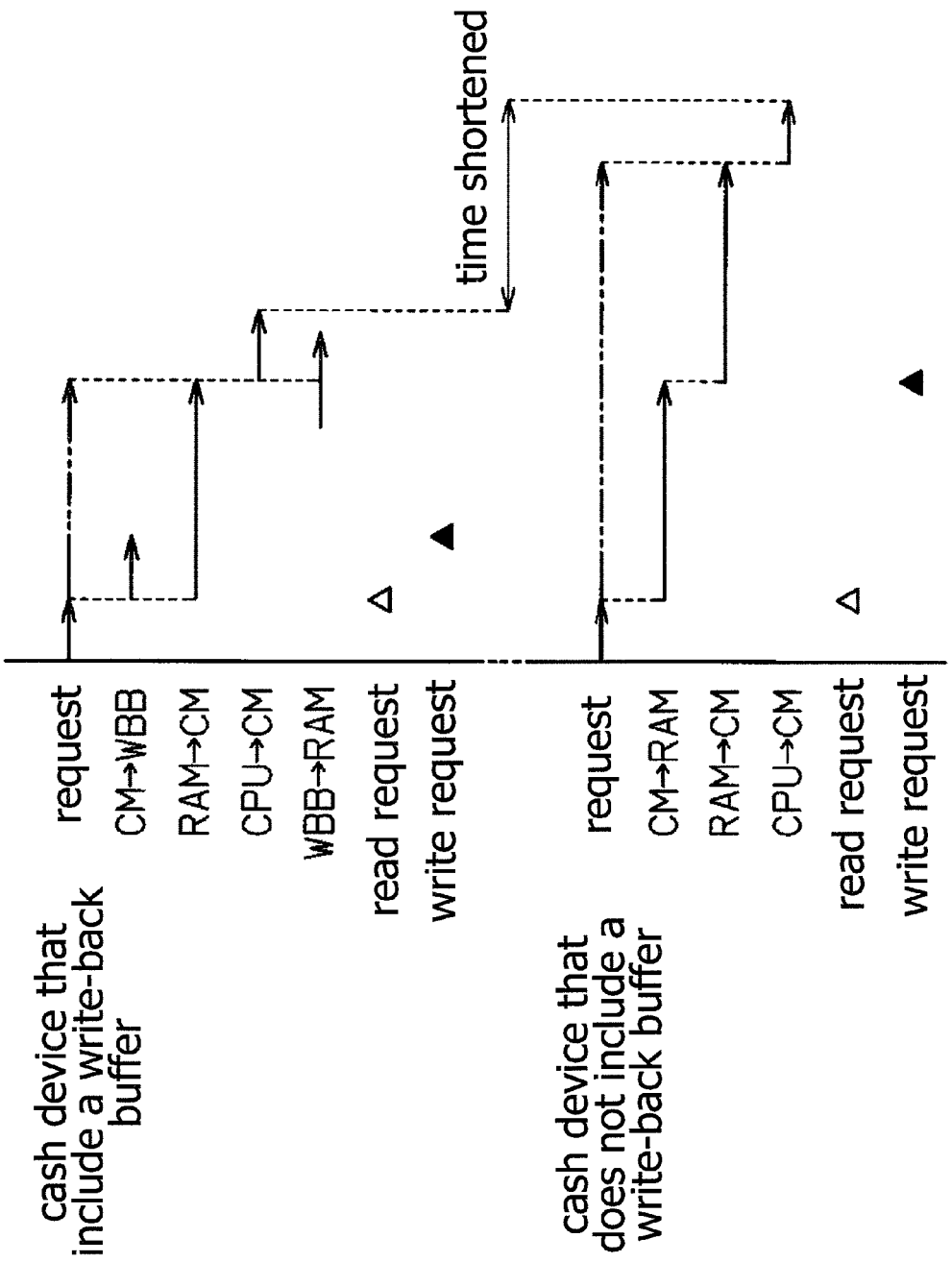
FIG. 11 is a timing diagram illustrating wire-back timings.

As illustrated in FIG. 11, when an access request (for example a write access) is output from the CPU 11 and a cache miss occurs, the control circuit 26 outputs a read request based on the address in the access request to the memory controller 13. The control circuit 26 transfers the data in line Lb of the cache memory 21 (see FIG. 10) to the write-back buffer 24 (CM→WBB). That is, the cache device 12 concurrently performs part of the operation of reading data from the main memory 14 into the cache memory 21 and the operation of transferring data from the cache memory 21 to the write-back buffer 24 as illustrated in FIG. 11. Since the data in line Lb has been transferred to the write-back buffer 24, data can be written into line Lb.

When subsequently the data read from the main memory 14 is output from the memory controller 13, the control circuit 26 stores the data into the cache memory 21 (RAM→CM). The control circuit 26 permits the CPU 11 to access to the cache memory 21 and stores data output from the CPU 11 into the cache memory 21 (line Lb) (CPU→CM). With the storage of the data, the operation for the access request from the CPU 11 will end. The time that elapses between the output of the access request from the CPU 11 and the storage of the data output from the CPU 11 into the cache memory 21 is the response time to the CPU 11.

In contrast, when an access request has resulted in a cache miss in a cache device that does not include a write-back buffer (conventional cache device), line data is written back from a cache memory to the main memory (CM→RAM). Then the main memory is accessed to store data into the cache memory (RAM→CM). Data output from the CPU is stored into the cache memory (CPU→CM). In this way, in the conventional cache system, the CPU 11 that has issued an access request has to wait the write-back time period and the time during which data is being transferred from the main memory to the cache memory. In contrast, the cache device 12 according to the present embodiment keeps the CPU 11 waiting only the time during which data is being transferred from the main memory 14 to the cache memory 21, that is, has a shorter response time. The response time can be further reduced by using the write buffers 22a, 22b depicted in FIG. 2 as described above.

Once data has been stored in the write-back buffer 24, the control circuit 26 outputs a write request for storing the data from the write-back buffer 24 into the main memory 14 to the memory controller 13. Thus, the control circuit 26 can output the write request immediately after outputting the read request to the memory controller 13 in response to the cache miss.

Figure 12:
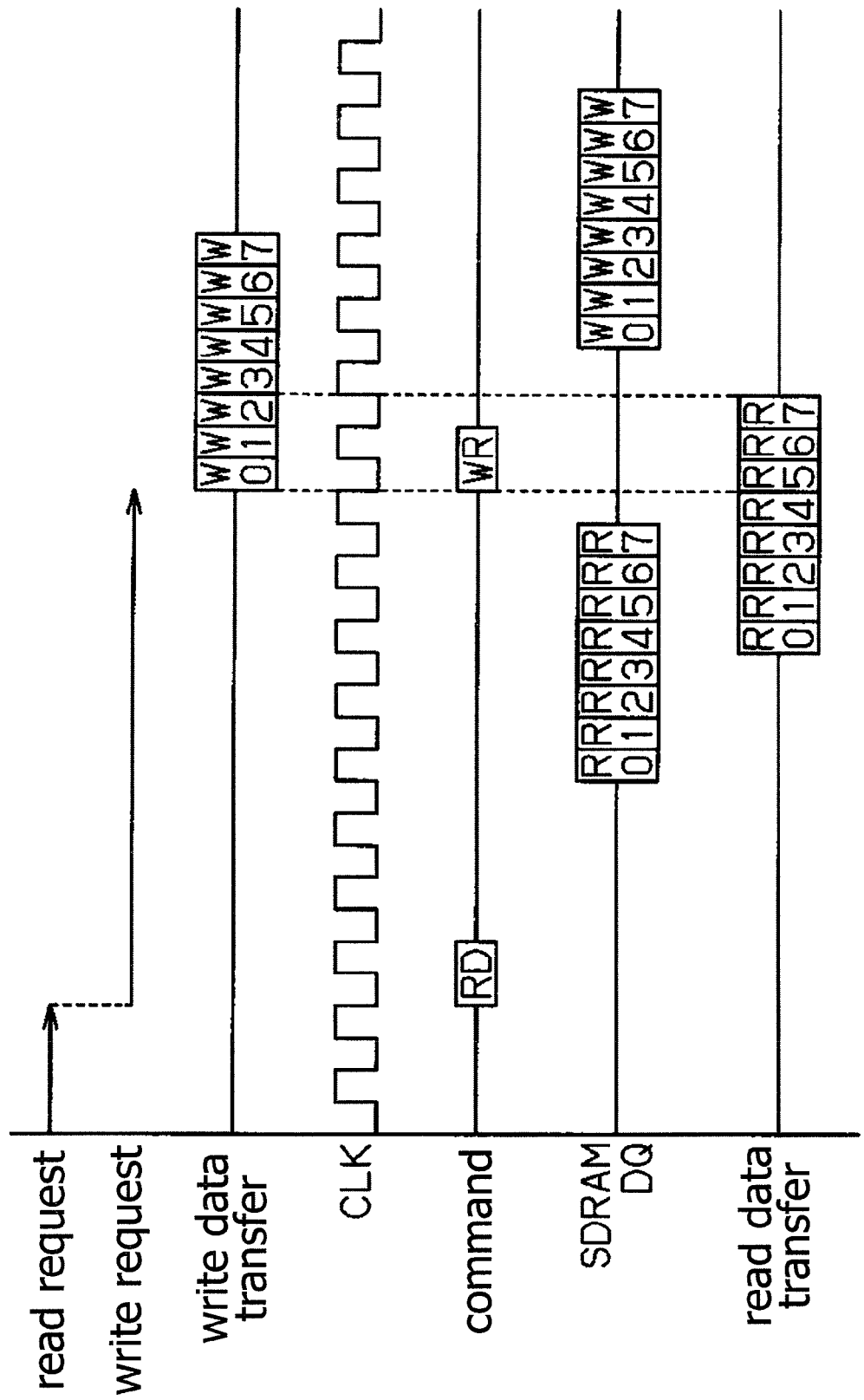
FIG. 12 is a timing diagram illustrating a write-back timing.

Data to be written into the main memory 14 is output from the write-back buffer 24 and data to be written into the cache memory 21 is input directly from the memory controller 13 into the cache memory 21. As illustrated in FIG. 12, read data transfer can overlap write data transfer if the memory controller 13 is efficient enough. Therefore, in order to prevent contention between read data and write data for the bus between the cache device 12 and the memory controller 13 or for the bus between the memory controller 13 and the main memory 14, separate busses are provided or operation timings (or data output timings) of the memory controller 13 and the main memory 14 are controlled so that data can be output from the write-back buffer 24 concurrently with other operation as illustrated in FIG. 11, thereby performance can be improved.

The present embodiment may have advantageous effects described below.

(1) The cache device 12 has the write buffers 22a and 22b between the CPU 11 and the cache memory 21. The control circuit 26 concurrently performs a write operation of storing data output from the CPU 11 into one of the write buffers 22a and 22b and a memory read operation of reading data from the main memory 14 into the cache memory 21 in response to a cache miss. Consequently, the write access by the CPU 11 will end by storing data in the write buffer 22a, 22b. Therefore, the response time to CPU 11 is reduced and fast access speed can be achieved.

(2) The cache device 12 includes two write buffers 22a and 22b. Since the control circuit 26 can alternately use the write buffers 22a and 22b in accordance with the address of data that the CPU 11 is attempting to write, the response time to consecutive write accesses can be reduced.

(3) The cache device 12 has the read buffer 23 between the CPU 11 and the cache memory 21. The control circuit 26 transfers one line of data from the cache memory 21 to the read buffer 23 in response to an access request from the CPU 11, and outputs the read data from the read buffer 23. Since the request accessing the address of data stored in the read buffer 23 can be serviced by outputting read data from the read buffer 23, the response time can be reduced and fast access speed can be achieved.

(4) The cache device 12 includes the path (data path) P1 for providing data read from the cache memory 21 directly to the CPU 11. Accordingly, the time requested from delivering data to the CPU 11, or the response time, can be reduced compared with a cache device that temporarily stores the data of line L2 into the read buffer 23 and then outputs the data from the read buffer 23 to the CPU 11. Thus, fast access speed can be achieved.

(5) The cache device 12 is capable of storing write data WDc output from the CPU 11 into the read buffer 23. If the address of data stored in the write buffer 22a or 22b is the similar to the address of any of the data stored in the read buffer 23, the control circuit 26 stores write data output from the CPU 11 into the write buffer 22a, 22b and also into the read buffer 23. Therefore, when a read access to the similar address occurs, coherency between the data in the write buffer 22a and the data in the read buffer 23 can be maintained. Consequently, as illustrated in FIG. 9A, in response to the next read access (R), the data at the similar address can be output from the read buffer 23 to the CPU 11 and therefore the response time can be reduced. That is, fast access speed can be achieved.

(6) The cache device 12 includes the write-back buffer 24. When the control circuit 26 determines that an access request has resulted in a cache miss, the control circuit 26 transfers the data in line Lb to be written back to the memory 14 to the write back buffer 24. The control circuit 26 outputs a write request to the memory controller 13 and then reads the data stored in the write-back buffer 24 and stores the data into the main memory 14 through the memory controller 13. As a result, before the data is stored in the main memory 14, the data requested by the access request can be read from the main memory 14 and therefore the response time to the CPU 11 can be reduced and fast access speed can be achieved.

Variations of the embodiment described above may also be implemented.

While the write-back buffer 24 is used to improve the access speed in a write-back operation in the embodiment described above, other mechanisms may be used to improve the access speed.

For example, write back may be performed at a different timing.

The control circuit 26 depicted in FIG. 2 cyclically uses the lines in the cache memory 21 as previously described. The control circuit 26 stores in the management area 31 depicted in FIG. 3 the total number of lines in the cache memory 21, the number of used lines which indicates the number of lines storing valid data, the start pointer indicating the line storing the most recent data, and the end pointer indicating the line storing the least recently used data. The control circuit 26 stores a change bit 32c and a valid bit 32d associated with each line in the tag area 32 depicted in FIG. 3. When the control circuit 26 determines on the basis of these items of information that there is no available cache line, the control circuit 26 performs a write-back operation.

When an access request from the CPU 11 has resulted in a cache miss, the control circuit 26 outputs a read request to the memory controller 13 in order to read data needed for servicing the access request from the main memory 14. The control circuit 26 stores the data read from the main memory 14 into an invalid line and validates the line. The control circuit 26 determines whether a line is valid or not on the basis of whether the data stored in the line is valid or not.

Valid line data is data that needs to be held in the cache memory 21 or the main memory 14; invalid line data is data that does not need to be held.

One kind of valid data is data written by the CPU 11. Each line of the cache memory 21 stores data read from the main memory 14. The data can be modified by processing executed by the CPU 11. Data generated by processing executed by the CPU 11 is also written in a line in the cache memory 21. Such data is inconsistent with the data in the main memory 14 and needs to be written in the main memory 14, therefore the data needs to be held in the cache memory 21.

Another kind of valid data is data that has been recently read from the main memory 14 and stored in a line of the cache memory 21. The cache device 12 has locality of data reference, meaning that data accessed or data having addresses adjacent to the address of the data accessed is likely to be accessed in the near future. Therefore, such data needs to be held in the cache memory 21.

Another kind of invalid data is written-back data. Yet another kind of invalid data is the least recently used data.

Figures 13A, 13B:
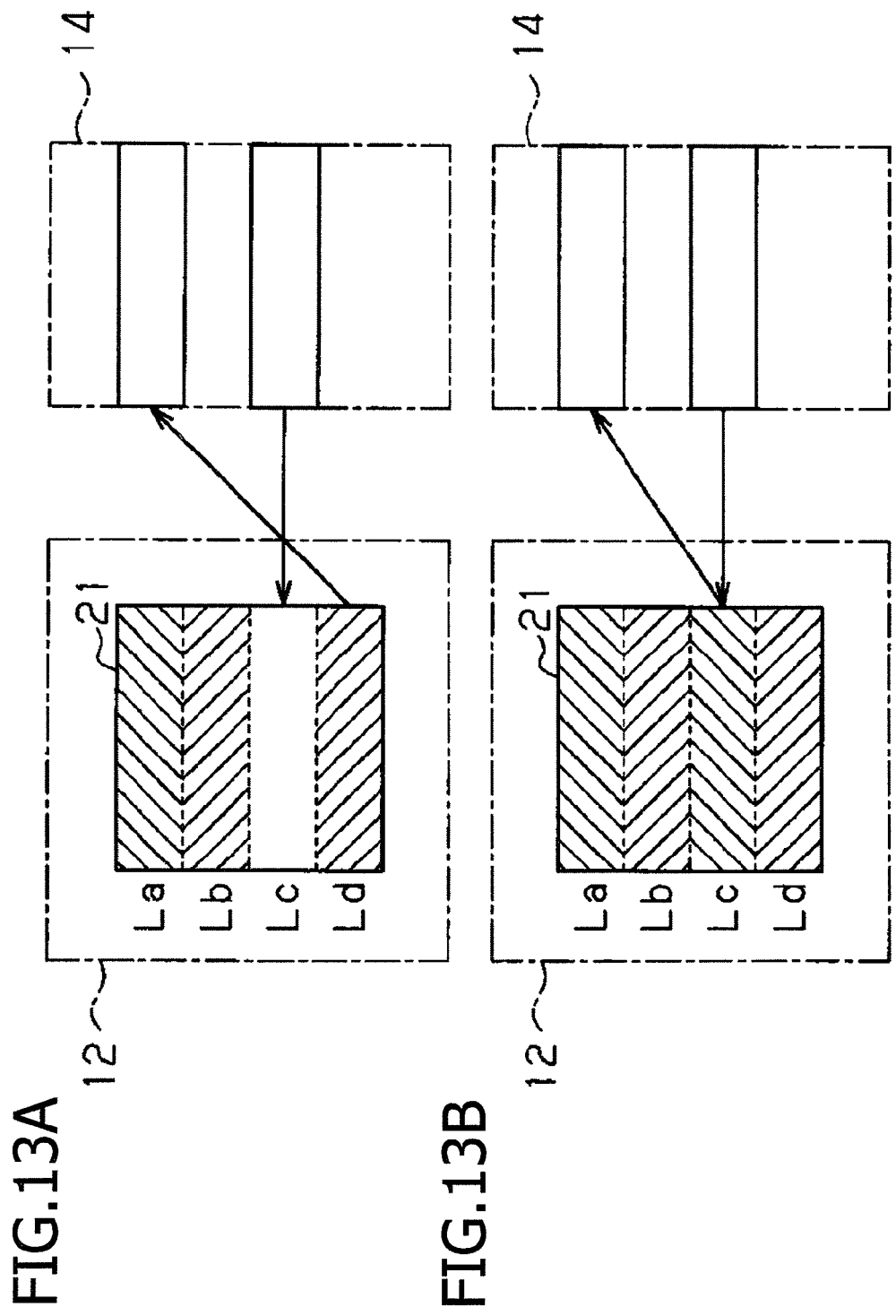
FIGS. 13A and 13B are diagrams illustrating write-back operations.

The control circuit 26 uses the lines of the cache memory 21 in a round robin fashion and manages the usage of the lines by using information in the management area 31 illustrated in FIG. 3. As has been described above, the control circuit 26 reads data from the main memory 14 and writes the data into line Lc as illustrated in FIG. 13A and validates line Lc. Accordingly, once data have been written in all lines La to Ld, all lines become valid. At this time point, the data stored in line Ld pointed to by information in the management area 31, namely the end pointer, is the least recently used data.

The control circuit 26 determines on the basis of the change bit 32c associated with line Ld whether data in line Ld has been altered or not. If the data has been altered, the control circuit 26 writes back the data in line Ld. The control circuit 26 sets the valid bit 32d in the tag area 32 that is associated with line Ld pointed to by the end pointer to "0" to invalidate line Ld, and changes the end pointer to a value indicating the next line, La.

That is, when the control circuit 26 has stored data read from the main memory 14 into the cache memory 21 in response to a cache miss, the control circuit 26 determines whether a write back is requested or not. If requested, that is, data in the line has been altered, the control circuit 26 performs a write back and invalidates the line.

A line of the cache memory 21 is overwritten with data written by the CPU 11, that is, with data read from the main memory 14. An invalidated line is prohibited from being overwritten by other data and holds the residing data until a write back is performed. Accordingly, when a request to access the invalidated line occurs, the control circuit 26 can validate the line by setting the valid bit 32d associated with the line to "1". This will reduce the response time compared with reading the data from the main memory 14. That is, fast access speed can be achieved.

As a result of validating the invalidated line in this way, there will be no longer an available line. Since the validated line contains the most recently used data, the control circuit 26 sets the start pointer to the line number of the validated line. Since available lines have been used up, the control circuit 26 determines whether the line pointed to by the end pointer needs to be written back as described above, writes back the line if needed, and then invalidates the line.

Data read from the main memory 14 as a result of memory access caused by a cache miss can be stored in the invalidated line. That is, when an access request from the CPU 11 has resulted in a cache miss, the control circuit 26 outputs a read request to the memory controller 13. The control circuit 26 reads data from the main memory 14 and stores the data into the line invalidated as described above. In other words, the line in which data read in response to a cache miss is to be written is invalidated in response to access to the main memory 14 made prior to the cache miss. It also can be said that the data in the line in which data read in response to a cache miss is to be written is written back in response to access to the main memory 14 made prior to the cache miss. That is, the control circuit 26 writes back the data in the line in which data is to be written in response to a cache miss prior to the cache miss. Accordingly, there is an invalid line whenever a cache misses occurs and therefore the response time can be reduced compared with writing back data after a cache miss.

The invalidated line described above with respect to FIG. 13A can be said to be the next line in which data being read out from the main memory into the cache memory is to be stored when a cache miss occurs.

FIG. 13B illustrates an operation performed in a conventional cache device that does not perform a write back described above. Elements that are the similar to those in the present embodiments are given the similar reference symbols or numerals in FIG. 13B. All lines La to Ld of the cache memory 21 contain data. The data in line Lc of the cache memory 21 is written back into the main memory 14 and then data read from the main memory 14 is stored in line Lc.

FIG. 14A and FIG. 14B illustrate an operation performed by the cache device 12 and an operation performed by a conventional cache device which does not perform anticipatory write back in response to a write access request.

When an access request has resulted in a cache miss in the cache device 12 according to the present embodiment, the main memory 14 is accessed to read data from the main memory 14 and the data is stored into the cache memory 21 (RAM→CM). Data output from the CPU 11 is stored into the cache memory 21 (CPU→CM) and data in the next line of the cache memory 21 is written back into the main memory 14 (CM→RAM). The response time to the CPU 11 is the time expires between the output of the access request from the CPU 11 and the storage of the data output from the CPU 11 into the cache memory 21.

In the conventional cache device, when an access request has resulted in a cache miss, the data in the line is written back from the cache memory to the main memory (CM→RAM) as illustrated in the FIG. 14B. Then, the main memory is accessed to read data into the cache memory (RAM→CM). Data output from the CPU is stored into the cache memory (CPU→CM). The time the request from the CPU has to wait includes the time during which write back is performed and the time during which data is transferred from the main memory to the cache memory in the conventional cache device. In contrast, the operation of the cache device 12 illustrated in the FIG. 14A, the CPU which has issued an access request has to wait only the time during which data is transferred from the main memory to the cache memory and therefore experiences a shorter response time. The response time is further reduced by using the write buffers 22a and 22b depicted in FIG. 2 as described earlier.

Figure 15A:
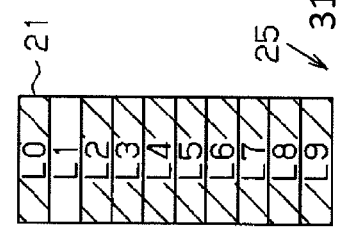
FIGS. 15A to 15C are diagrams illustrating a write-back operation.
Figure 15B:
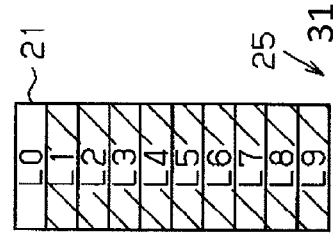

While the valid bit 32d associated with the line written back is set to "0" to invalidate the line in the foregoing description, the valid bit 32d may be kept at "1". As illustrated in FIG. 15A, data have been stored in lines L0 to L8 of the cache memory 21. Accordingly, the start pointer in the management area 31 is pointing to L8 and the end pointer is pointing to L0. When a cache miss occurs while the cache memory 21 is in this state, the control circuit 26 stores data in line L9, sets the start pointer to L9, and sets the valid bit 32d associated with line L9 to "1" as illustrated in FIG. 15B. The control circuit 26 writes back the data in line L0 pointed to by the end pointer in FIG. 15A and then sets the end pointer to L1 as illustrated in FIG. 15B.

Figure 15C:
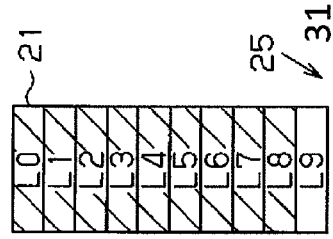

When a cache miss occurs next time, data is similarly stored in line L0 and the start pointer is set to L0 as illustrated in FIG. 15C. The control circuit 26 writes back the data in line L1 pointed to by the end pointer in FIG. 15B and then sets the end pointer to L2 as depicted in FIG. 15C.

In this way, the valid bit 32d of the line written back is kept at "1" to prevent reduction in the number of valid lines. Since the number of lines that can be hit is not reduced, the ratio of the number of cache hits to the total number of access requests, namely the hit ratio, is improved.

While the bus width between the CPU 11 and the write buffers 22a, 22b and the bus width between the write buffers 22a, 22b and the cache memory 21 are the similar in the embodiments described above, the buses may have different widths.

Figure 16:
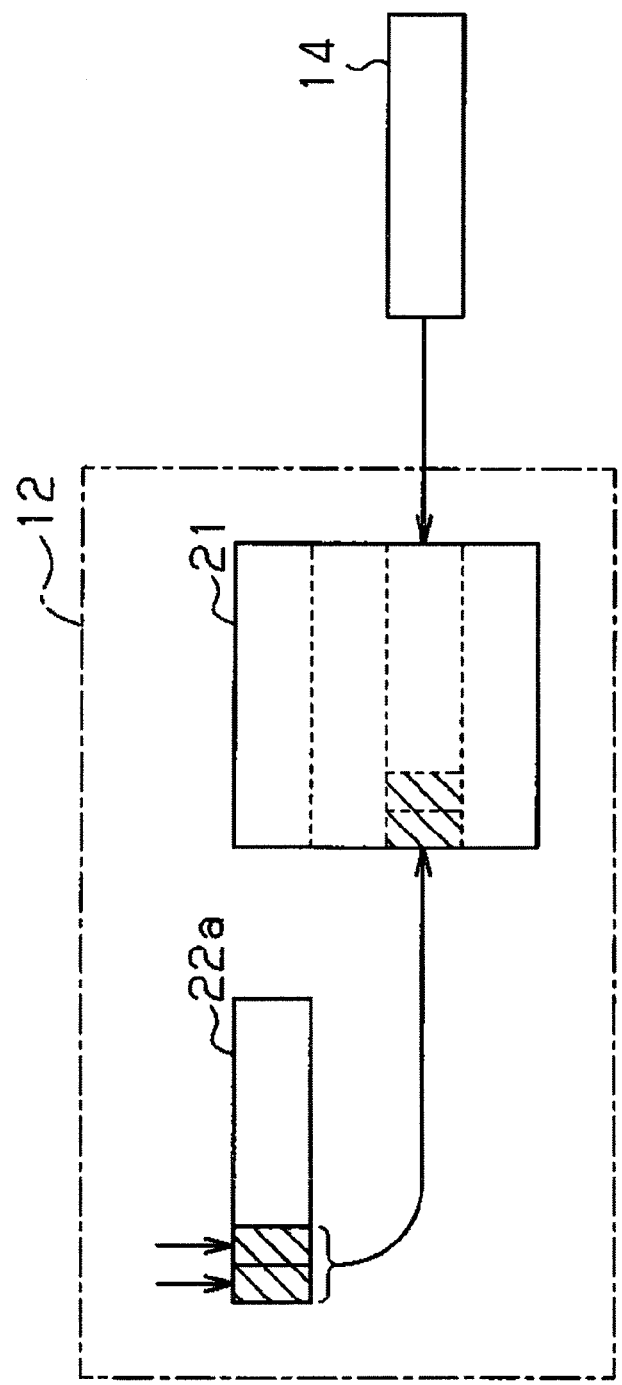
FIG. 16 is a diagram illustrating a data write operation.
Figure 18:
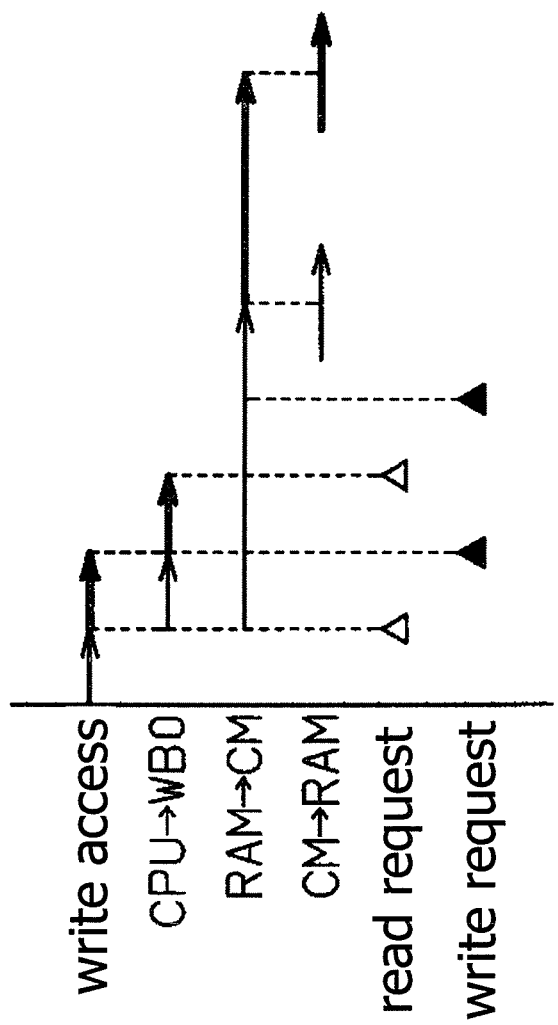
FIG. 18 is a timing diagram illustrating a write-back timing.

For example, the bus width between the write buffers 22a, 22b and the cache memory 21 may be n times larger than the bus width between the CPU 11 and the write buffers 22a, 22b (n=2, 4, 8, . . .) as illustrated in FIG. 16. For example, if the bus width between the write buffers 22a, 22b and the cache memory 21 is twice the bus width between the CPU 11 and the write buffers 22a, 22b, data written into the write buffer 22a by two accesses can be transferred to the cache memory 21 at a time as illustrated in FIG. 18. Since the number of transfer cycles requested from transferring data from the write buffer 22a or 22b to the cache memory 21 can be reduced in this way, the influence of the operation of transferring data from the write buffer 22a or 22b to the cache memory 21 on the operation of writing data from the CPU 11 to the write buffer 22a or 22b can be reduced. That is, if the CPU 11 outputs a write access request while data is being transferred from the write buffer 22a or 22b to the cache memory 21, the write access has to wait until the completion of that data transfer. By reducing the time requested from data transfer from the write buffer 22a, 22b to the cache memory 21, the possibility of the data transfer overlapping a write access by the CPU 11 can be decreased, or the time between the issuance of the write access request and the permission of the write access can be reduced. That is, the latency for the access request can be reduced.

Figure 17:
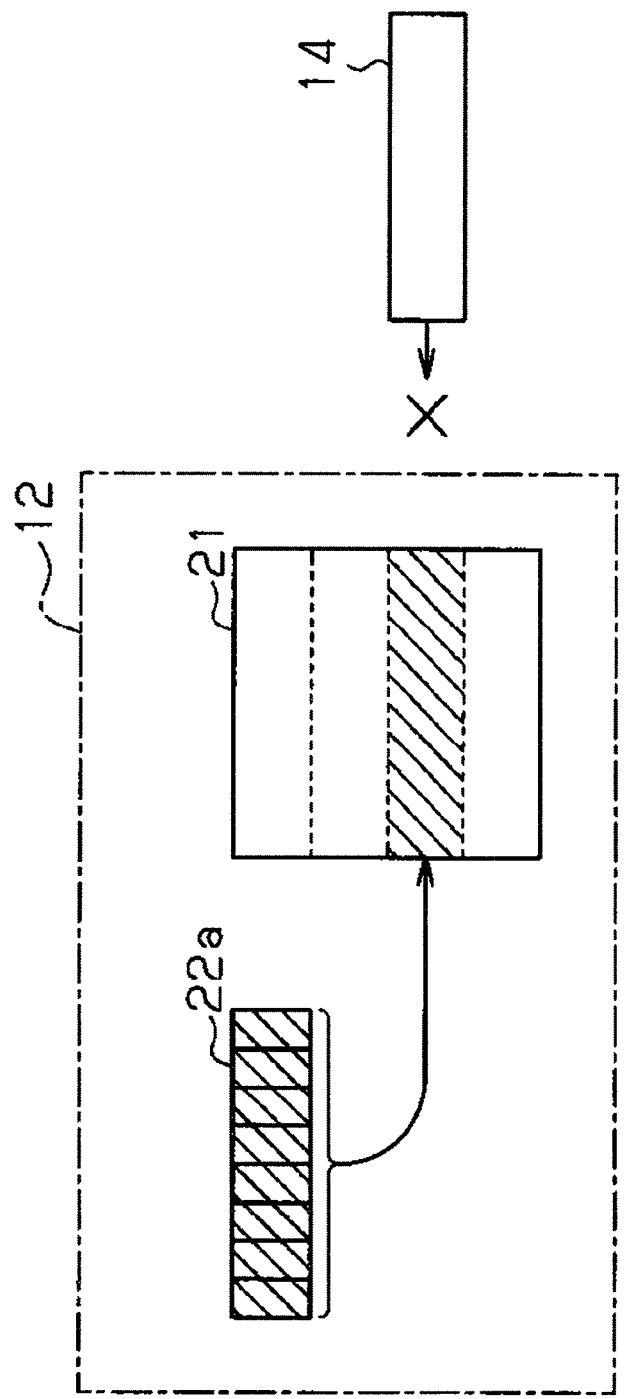
FIG. 17 is a diagram illustrating a data write operation.

As depicted in FIG. 17, the bus width between the write buffers 22a, 22b and the cache memory 21 may be equal to the capacity of each of the write buffers 22a and 22b as illustrated in FIG. 17, in which case the number of transfer cycles requested from transferring data from any of the write buffers 22a and 22b to the cache memory 21 can be reduced and therefore the latency can be reduced. Furthermore, when the similar amount of transfer data as the capacity of the write buffer 22a, 22b that is to be written from the write buffer 22a or 22b into the cache memory 21 (which may be burst transfer, for example) is transferred, a read request to the main memory 14 is canceled regardless of whether the request has resulted in a cache hit or miss. Then, all data contained in the line of the cache memory 21 is overwritten with the data written into the write buffer 22a or 22b. This eliminates the need for transferring data from the main memory 14 to the cache memory 21. Even if a write access request from the CPU 11 has resulted in a cache miss, data is not transferred from the main memory 14 to the cache memory 21. This can reduce the latency for write access and make the write access faster. Since the operation of reading data from the main memory 14 for a write access request is omitted, the number of accesses to the main memory 14 can be reduced.

While the embodiments have been described with respect to the single cache memory 21, cache memories may be formed by multiple RAMs (multiple memory chips or blocks). In such a configuration, multiple access requests can be serviced consecutively.

When two read requests and two write requests to the main memory 14 occur alternately as illustrated in FIG. 18, a read operation for one of the read requests can overlap an operation to write to the write-back buffer 24.

In the case of a single cache memory 21 including lines L0 to L9 as illustrated in FIG. 19A, the data in a line to be used in response to a cache miss is stored in a write buffer and data read from the main memory 14 is stored in that line. The access requests are handled in the sequence given below. In the following description, "Read line n" (n is the line number) represents data transfer from a line of the cache memory 21 to the write-back buffer and "Write line m" (m is the line number) represents data transfer from the main memory 14 to line m.

When line L0 is used:
<1-1> Read line L0 and write line L0
<1-2> Read line L1 and write line L1

When line L1 is used:
<2-1> Read line L1 and write line L1
<2-2> Read line L2 and write line L2

Here, write operation <1-1> overlaps read operation <1-2>. The same applies to the case where line L1 is used. Therefore, these operations may not concurrently be performed.

To circumvent this problem, two cache memories 41 and 42 are provided and line numbers are alternately assigned to the lines of the cache memories 41 and 42 as illustrated in FIG. 19B. In this configuration, write operation <1-1> is performed on the cache memory 41 whereas read operation <1-2> is performed on the cache memory 42. Since the operations are performed on the different cache memories, they can be concurrently performed.

If anticipatory write back as described previously is performed, requests to access one cache memory 21 will be as follows:

When line L0 is used:
<3-1> Read line L1 and write line L0
<3-2> Read line L2 and write line L1

When line L1 is used:
<4-1> Read line L2 and write line L1
<4-2> Read line L3 and write line L2

Here, write operation <3-1> overlaps read operation <3-2>. The same applies to the case where line L1 is used. Therefore, these operations may not concurrently be performed.

To circumvent this problem, two cache memories 51 and 52 are provided in a cache device. Line numbers 4N and 4N+3 are arranged adjacent to each other in one of the cache memories 51 and 52 and line numbers 4N+1 and 4N+2 are arranged adjacent to each other in the other cache memory (where N is an integer greater than or equal to 0). These rules are alternately applied to the two cache memories 51 and 52. For example, in the cache device including the cache memories 51 and 52, lines L0 and L3 are arranged adjacent to each other in the cache memory 51 and lines L1 and L2 are arranged adjacent to each other in the cache memory 52 as illustrated in FIG. 19C. Then lines L2 and L5 are arranged adjacent to each other in the cache memory 52 and lines L3 and L4 are arranged adjacent to each other in the cache memory 51. In this arrangement, write operation <3-1> is performed on the cache memory 51 whereas read operation <3-2> is performed on the cache memory 52. Since these operations are performed on the different cache memories, the operations can be concurrently performed.

While the cache device 12 in the embodiments described above holds data from the main memory 14, data held in the cache device 12 is not limited to data from the main memory 14. Any of the present embodiments may be applied to a cache device for other memory medium unit such as a magnetic disk unit, an optical disk unit, a magneto-optical disk unit.

Based on the embodiments described above, a cache device may be embodied that includes at least one of a write buffer, a read buffer, and a write-back buffer.

While the cache device 12 according to the embodiments described above includes the write buffers 22*a* and 22*b* and the read buffer 23, the cache device may include a plurality of readable and writable buffers. The number of buffers included in the cache device may be changed as appropriated.

While the cache memory 21 in the present embodiments described above is a single-port static RAM, the cache memory 21 may be a dual-port RAM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A cache unit, comprising:
a cache memory configured to store data from a memory;
a first buffer configured to hold output data from a processor; and
a control circuit cored to perform a first operation and a second operation when a cache miss has occurred in response to an access request to access the memory, the first operation including a first store operation of the output data based on the access request in the first buffer, the second operation including an output operation of a read request for reading data in a line including data requested by the access request and a second store operation of the data read from the line of the memory into the cache memory,
wherein the first operation and the second operation are performed in parallel.

2. The cache unit according to claim 1, wherein the cache memory includes a plurality of lines, each having a capacity n times larger than the output data (where n is an integer greater than or equal to 2), and storing data from the memory into the lines; and the first buffer has a storage capacity capable of storing at least one line of data from the cache memory.

3. The cache unit according to claim 2, further comprising:
a plurality of buffers, each including the data in a different line,
wherein, if an address of the output data is not within an address range of the data in the line included in a first one of the buffers, a second one of the buffers is alternately selected, the address of the output data being within the address range of the data in the line included in the second one of the buffers.

4. The cache unit according claim 2, wherein:
the amount of the output data transferred from the first buffer to the cache memory is set equal to the capacity of the line; and
when the access request is a write access request and the write access request results in the cache miss, data read from the memory for the cache miss is cancelled.

5. The cache unit according to claim 1, further comprising a second buffer holding input data to be output from the cache memory to the processor.

6. The cache unit according to claim 5, further comprising a path for outputting input data from the cache memory directly to the processor,
wherein when one line of data is transferred from the cache memory to the second buffer, data requested by the access request is stored in the second buffer and is output to the processor.

7. The cache unit according to claim 6, further comprising a third buffer holding data output from the processor;
wherein when an attempt is made to store the write data into the third buffer in response to the access request, the output data is stored in the second buffer if the address of the output data is within the address range of the second buffer.

8. The cache unit according to claim 7, wherein the validity of data in each line is managed and the data in the line written back is invalidated.

9. The cache unit according to claim 5, further comprising a third buffer holding data output from the processor;
wherein when an attempt is made to store the write data into the third buffer in response to the access request, the output data is stored in the second buffer if the address of the output data is within the address range of the second buffer.

10. The cache unit according to claim 1, wherein the cache memory includes a plurality of lines which are used in turn to store data from the memory, a line being available for storing data from the memory, and when there is no available line, data in a line to be used when a next cache miss occurs is written back to the memory.

11. The cache unit according to claim 10, wherein a read request is output to the memory data to be written back from the cache memory to the memory is transferred to the first buffer, and data read from the memory is stored in the cache memory.

12. The cache unit according to claim 11, wherein when there is a cache hit in the invalidated line, the line is validated and data in a line to be used when a next cache miss occurs is written back to the memory.

13. The cache unit according to claim 10, wherein the validity of data in each line is managed and data in the written back line is kept valid.

* * * * *